(12) United States Patent
Cho et al.

(10) Patent No.: US 9,974,107 B2
(45) Date of Patent: May 15, 2018

(54) RADIO NODE COMMUNICATING WITH TERMINAL IN COMMUNICATION ENVIRONMENT SUPPORTING PLURALITY OF RADIO NETWORKS, AND RADIO COMMUNICATION METHOD

(71) Applicant: LG Electronics Inc., Seoul (KR)

(72) Inventors: Heejeong Cho, Seoul (KR); Hyunsoo Ko, Seoul (KR); Hyeyoung Choi, Seoul (KR); Ilmu Byun, Seoul (KR); Kungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 61 days.

(21) Appl. No.: 14/916,333

(22) PCT Filed: Sep. 1, 2014

(86) PCT No.: PCT/KR2014/008145
§ 371 (c)(1),
(2) Date: Mar. 3, 2016

(87) PCT Pub. No.: WO2015/034227
PCT Pub. Date: Mar. 12, 2015

(65) Prior Publication Data
US 2016/0227597 A1    Aug. 4, 2016

Related U.S. Application Data

(60) Provisional application No. 61/873,799, filed on Sep. 4, 2013, provisional application No. 61/890,325, filed on Oct. 14, 2013.

(51) Int. Cl.
*H04W 4/00*    (2018.01)
*H04W 76/02*    (2009.01)
(Continued)

(52) U.S. Cl.
CPC ......... *H04W 76/025* (2013.01); *H04W 76/06* (2013.01); *H04W 8/06* (2013.01); *H04W 88/06* (2013.01)

(58) Field of Classification Search
CPC ..... H04W 76/025; H04W 76/06; H04W 8/06; H04W 88/06
See application file for complete search history.

(56) References Cited

U.S. PATENT DOCUMENTS

2014/0029513 A1*    1/2014    Takahashi ......... H04W 36/0005
370/328

FOREIGN PATENT DOCUMENTS

KR    100809260    3/2008
KR    1020100081167    7/2010
(Continued)

*Primary Examiner* — Kiet Tang
(74) *Attorney, Agent, or Firm* — Dentons US LLP

(57) ABSTRACT

The present invention relates to radio communications between a terminal, a radio node and a core network in a radio communication system. A radio node, which can form a radio link to a terminal through a first radio interface by a first radio protocol and a second radio interface by a second radio protocol, may transmit, to the terminal, function structure type information about a mobility management-related function which can be performed through the first radio interface by the first radio protocol, form a radio link to the terminal through the second radio interface by the second radio protocol, establish a connection between the terminal and a core network by a non-access stratum (NAS) protocol if the terminal requests a connection between the terminal and the core network through the second radio interface, release the radio link, and perform the mobility management-related function through the second radio interface by communicating with the terminal.

10 Claims, 23 Drawing Sheets

(51) Int. Cl.
*H04W 76/06* (2009.01)
*H04W 88/06* (2009.01)
*H04W 8/06* (2009.01)

(56) References Cited

FOREIGN PATENT DOCUMENTS

| | | |
|---|---|---|
| KR | 101063573 | 9/2011 |
| KR | 1020130035237 | 4/2013 |
| WO | 2011139074 | 11/2011 |

\* cited by examiner

RADIO NODE COMMUNICATING WITH TERMINAL IN COMMUNICATION ENVIRONMENT SUPPORTING PLURALITY OF RADIO NETWORKS, AND RADIO COMMUNICATION METHOD

This application is a 35 USC § 371 National Stage entry of International Application No. PCT/KR2014/008145 filed Sep. 1, 2014, and claims priority to U.S. Provisional Application Nos. 61/873,799 filed Sep. 4, 2013 and 61/890,325 filed Oct. 14, 2013, all of which are hereby incorporated by reference in their entireties as if fully set forth herein.

BACKGROUND OF THE INVENTION

Field of the Invention

The present invention relates to wireless communications, and more particularly, to a wireless node that communicates with a terminal in a communication environment in which a plurality of wireless networks is supported and a method for wireless communication.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

FIG. 1 is a schematic diagram illustrating a structure of evolved mobile communication network.

As shown in FIG. 1, an evolved UMTS terrestrial radio access network (E-UTRAN) is connected to an evolved packet core (EPC).

The E-UTRAN includes base stations (or eNodeBs) 20 that provides a control plane and a user plane to a user equipment (UE). The base stations (or eNodeBs) 20 may be interconnected through an X2 interface.

The radio interface protocol layers between the UE and the base station (or eNodeB) 20 may be divided by L1 (a first layer), L2 (a second layer) and L3 (a third layer) based on lower three layers of open system interconnection (OSI) standard model that is widely known in communication systems. Among these layers, a physical layer included in the first layer provides an information transfer service using a physical channel, and a radio resource control (RRC) layer located at the third layer performs a role of controlling radio resources between the UE and the base station. For this, the RRC layer exchanges a RRC message between the UE and the base station.

Meanwhile, the EPC may include various elements. FIG. 1 shows a mobility management entity (MME) 51, a serving gateway (S-GW) 52, a packet data network gateway (PDN GW) 53 and a home subscriber server (HSS) 54 among the various elements.

The base station (or eNodeB) 20 is connected to the mobility management entity (MME) 51 of the EPC through an S1 interface, and is connected to the serving gateway (S-GW) 52 through an S1-U.

The S-GW 52 is an element that operates at a boundary point between a radio access network (RAN) and a core network and has a function of maintaining a data path between an eNodeB 20 and the PDN GW 53. Furthermore, if a user equipment (UE) moves in a region in which service is provided by the eNodeB 20, the S-GW 52 plays a role of a local mobility anchor point. That is, for mobility within an E-UTRAN (universal mobile telecommunications system (Evolved-UMTS) terrestrial radio access network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or global system for mobile communication (GSM) (GERAN)/enhanced data rates for global evolution (EDGE) radio access network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an interworking wireless local area network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

Meanwhile, recently, the high speed data traffic has been rapidly increased. In order to meet such traffic increase, technologies have been introduced for offloading the traffic of UE to WLAN (Wi-Fi) or a small cell.

FIG. 2 is a schematic diagram illustrating a network structure to which a small cell or a WLAN AP is added.

Referring to FIG. 2, within the coverage of a base station 31 for the small cell, a plurality of WLAN AP may be arranged. That is, several radio access technologies (RATs) are existed around a UE. Accordingly, the UE may distribute data traffic into the several RATs. The base station 31 for small cell may be arranged within the coverage of a macro base station such as the existing eNodeB.

As known from by reference to FIG. 2, the P-GW 53 and the HSS 54 are connected to an access authentication authorization (AAA) server 56. The P-GW 53 and the AAA server 56 may be connected to an evolved packet data gateway (ePDG) 57. The ePDG 57 plays a role of a security node for not being trusted non-3GPP network (e.g., WLAN or Wi-Fi, etc.). The ePDG 57 may be connected to a WLAN access gateway (WAG) 58. The WAG 58 may be in charge of a role of P-GW in Wi-Fi system.

As such, as the existing mobile communication network is associated with a hetero network, an interface may be required for connecting and establishing session between a user equipment and a core network.

SUMMARY OF THE INVENTION

An object of the present invention is to provide a method for forming a radio link with a user equipment and for releasing a connection, if a user equipment is available to communicate through a radio interface by radio protocols different from each other.

Another object of the present invention is to provide a wireless node that may be changed according to a function that may be performed under a support of core network and a method for performing operation by a user equipment.

A method for wireless communication according to an embodiment of the present invention may include transmitting function structure type information on a mobility management related function that is available to be performed through a first radio interface by a first radio protocol to a user equipment; forming a radio link with the user equipment through a second radio interface by a second radio protocol; establishing connection by a non access stratum (NAS) protocol between the user equipment and a core network, if the user equipment requests a connection with the core network through the second radio interface; releasing the radio link; and performing the mobility management related function through the second radio interface by communicating the user equipment.

ADVANTAGEOUS EFFECTS

According to the present invention, a method for forming a radio link with a user equipment and for releasing a connection, if a user equipment is available to communicate through a radio interface by radio protocols different from each other is provided.

According to an embodiment of the present invention, a wireless node that may be changed according to a function that may be performed under a support of core network and a method for performing operation by a user equipment is provided.

DESCRIPTION OF EXEMPLARY EMBODIMENTS

A wireless device may be fixed and may have mobility, and may be referred to as other terms such as user equipment (UE), MS (mobile station), UT (user terminal), SS (subscriber station), and MT (mobile terminal). In general, a base station (BS) refers to a fixed station communicating with the wireless device, and may be referred to as other terms such as eNB (evolved-NodeB), BTS (base transceiver system), and access point (AP).

The following description will be made where the present invention is applied based on 3GPP (3rd Generation Partnership Project) 3GPP LTE (long term evolution) or 3GPP LTE-A (LTE-Advanced). This is illustrative purpose only and the present invention is applicable to various wireless communication networks. Hereinafter, the LTE includes LTE and/or LTE-A.

The present specification is described targeted to a communication network, and tasks performed in the communication network may be performed during controlling network by a system (e.g., a BS) that controls the corresponding communication network or performed by a UE which is linked to the corresponding network.

Figure 1:
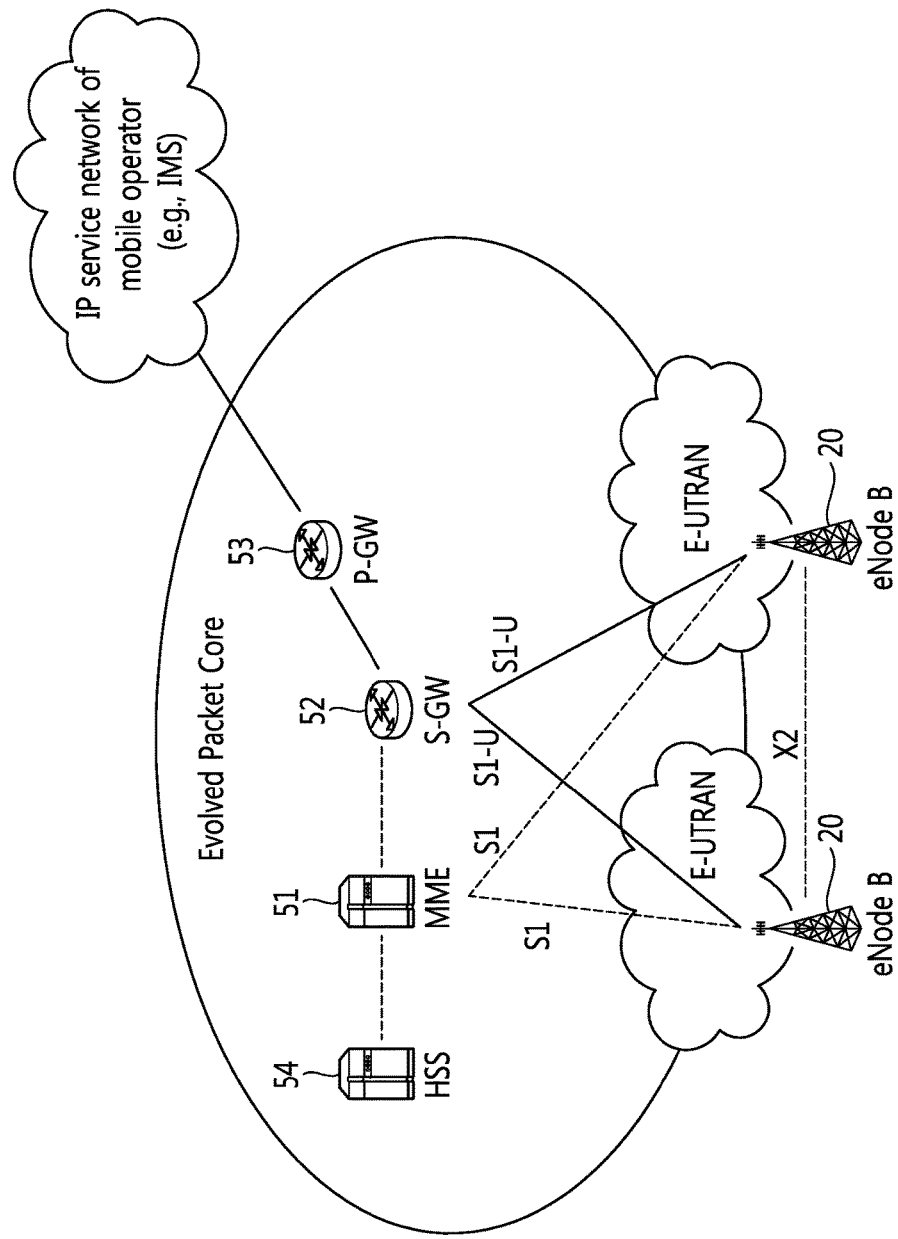
FIG. 1 is a schematic diagram illustrating a structure of evolved mobile communication network.
Figure 2:
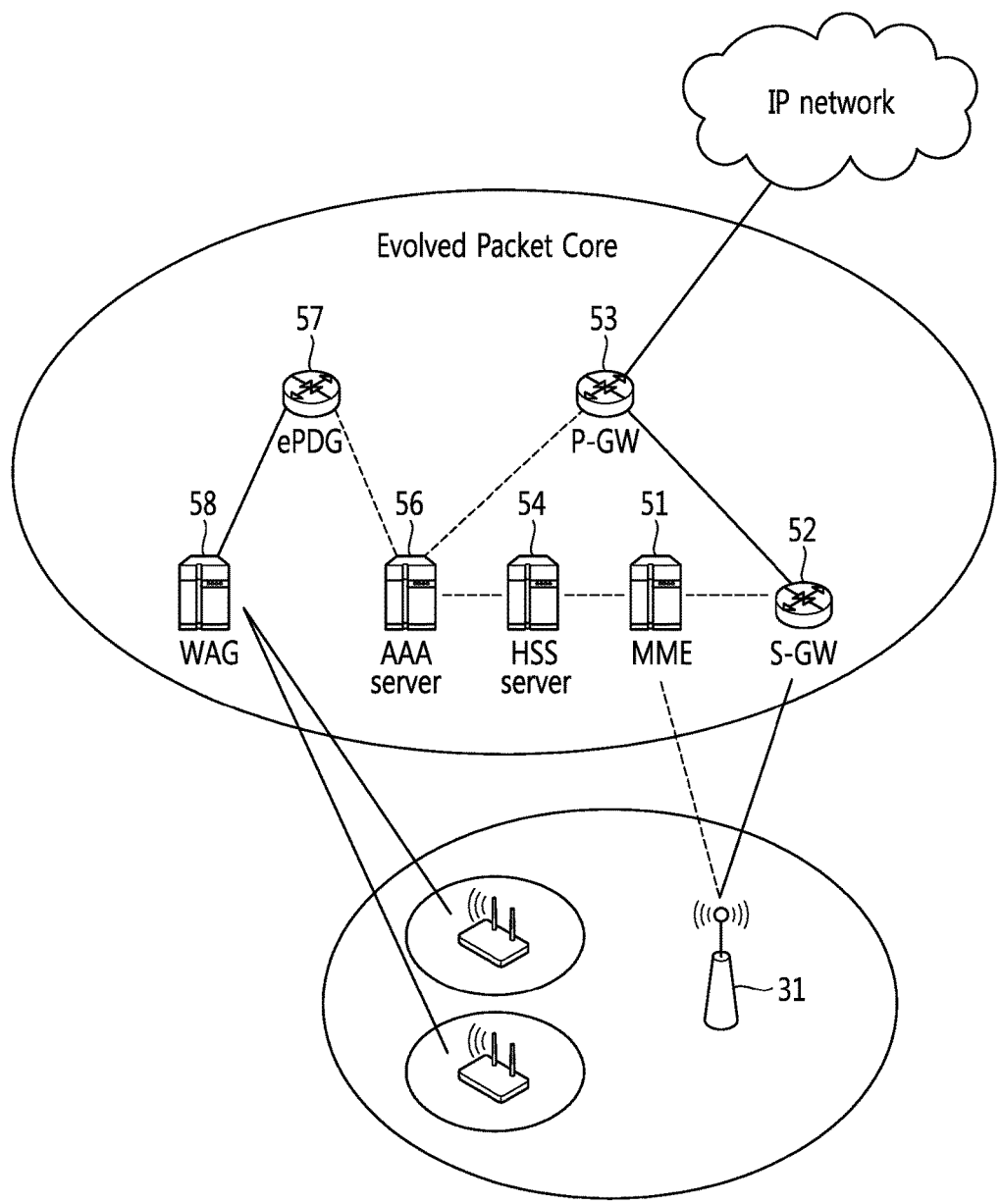
FIG. 2 is a schematic diagram illustrating a network structure to which a small cell or a WLAN AP is added.
Figure 3:
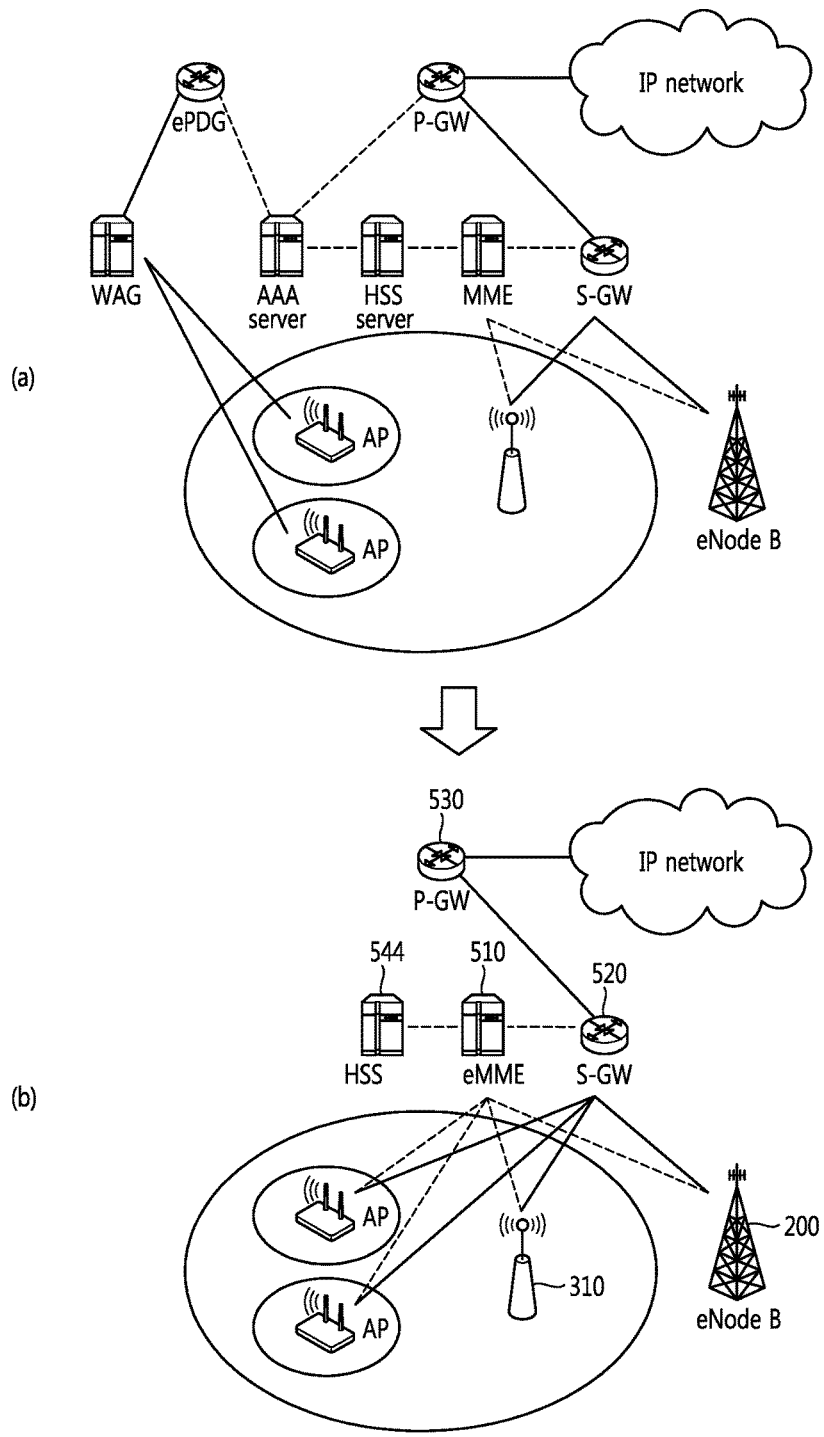
FIG. 3 is a diagram illustrating an example by comparing the existing mobile communication network structure and a network structure improved according to the present invention.

FIG. 3 is a diagram illustrating an example by comparing the existing mobile communication network structure and a network structure improved according to the present invention.

In comparison with the existing mobile communication network structure shown in FIG. 3 (a), an enhanced MME (eMME) 510 and an enhanced GW (eGW) 520 may be included according to the improved network structure shown in FIG. 3 (b). Although it is depicted that the eMME 510 and the eGW 520 are separated in FIG. 3 (b), the eMME 510 and the eGW 520 may be separated only in logical manner, but combined in a device in physical manner. In addition, although it is depicted that the eGW 520 and a P-GW 530 are separated in FIG. 3 (*b*), the eGW 520 and the P-GW 530 may be combined in a device.

The eMME 510 may be connected to a WLAN access point (AP) as well as an eNodeB 200 and a BS 310. For this, a new interface may be added between the eMME 510 and the WLAN AP. Similarly, the eGW 520 may be connected to the WLAN access point (AP) as well as the eNodeB 200 and the BS 310. For this, a new interface may be added between the eGW 520 and the WLAN AP.

FIG. 4*a* to FIG. 4*d* are a conceptual diagram illustrating a construction of radio entity (RE) that manages a BS and a WLAN AP integrally for a multi-RAT UE according to the present invention.

First, a radio entity (RE; or radio access device) 300 is a newly introduced device according to the present invention, and makes the management of the BS 310 and the WLAN AP 320 more easy in order to strengthen a support of the multi-RAT UE 100. Such a RE has various types according to the present invention.

Figure 4A:
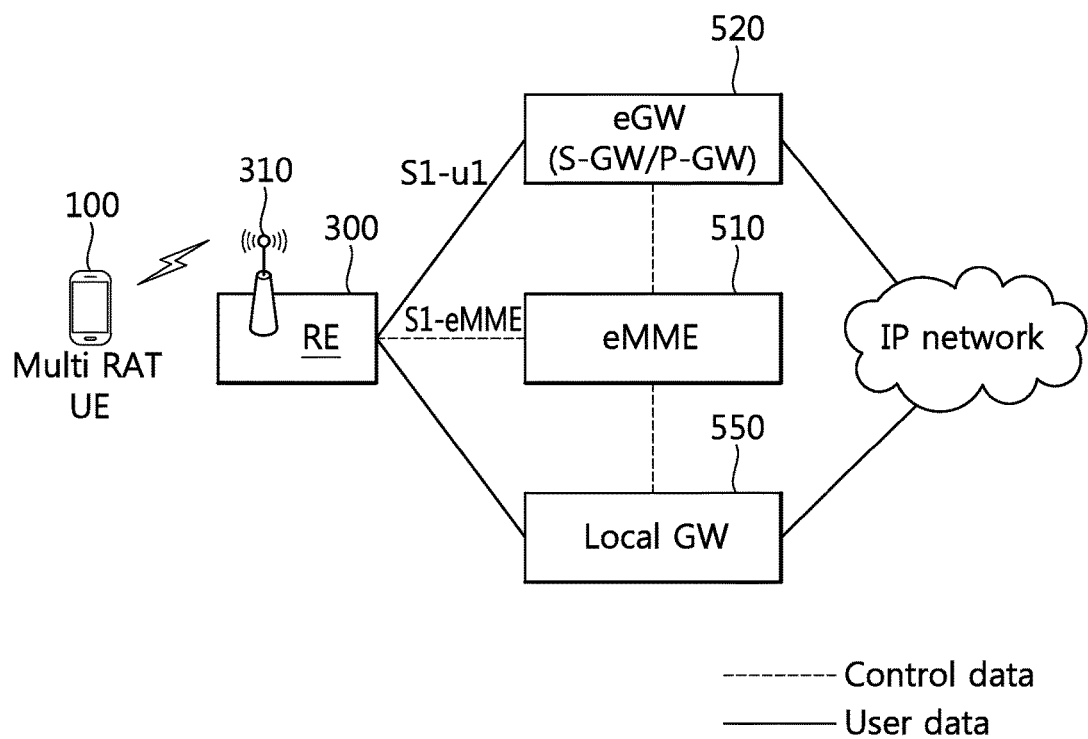
FIG. 4a to FIG. 4d are a conceptual diagram illustrating a construction of radio entity (RE) that manages a base station and a WLAN AP integrally for a multi-RAT UE according to the present invention.

FIG. 4*a* illustrates a concept of RE according to a first type, and the RE 300 according to the first type supports only the cellular BS 310. At the moment, the RE 300 of the first type may be integrated within the cellular BS 310. The RE 300 of the first type is connected to an eGW 520 and a local GW 550 for the transmission and reception of user data, and connected to an eMME 510 for the transmission and reception of control data. The eGW 520 may perform one or more function of the S-GW and the P-GW. The local GW 550 is a gateway that enables the RE to access to a home network of a home or an office.

The multi-RAT UE 100 and the RE 300 may be connected through an access stratum (AS) protocol, and the multi-RAT UE 100 and the eMME 510 may be connected through a non access stratum (NAS) protocol which is an interface between a UE and a core network.

As shown in FIG. 4*a*, an interface called S1-eMME may be formed between the RE 300 and the eMME 510, and an interface called S1-U1 may be formed between the RE 300 and the eGW 520.

Figure 4B:
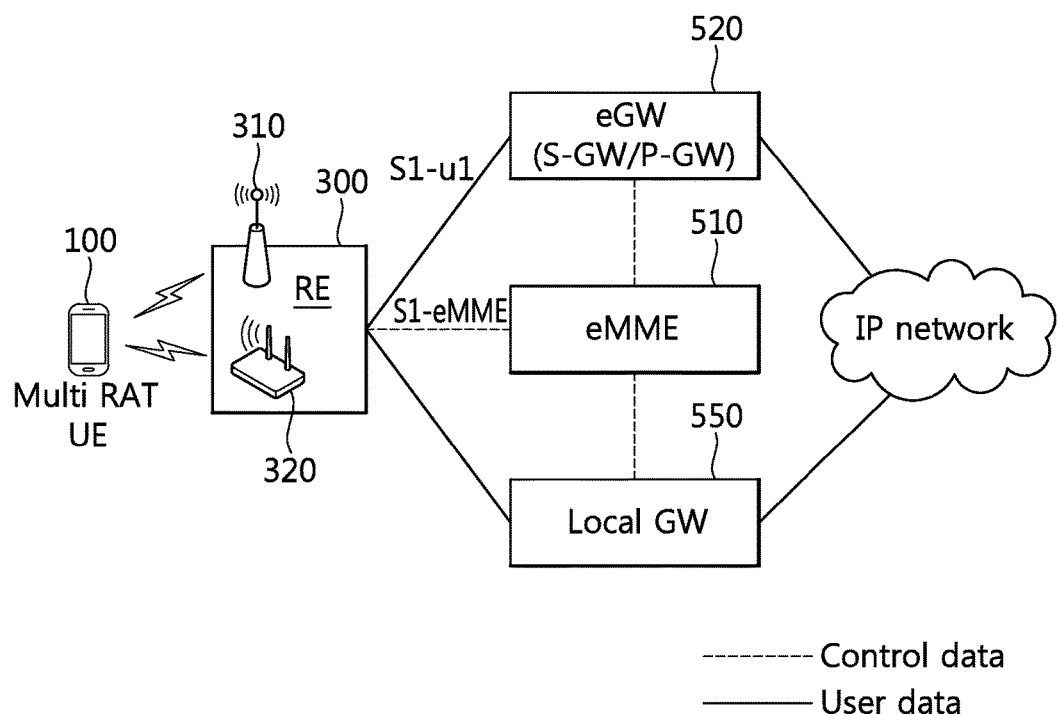

FIG. 4*b* illustrates a concept of RE according to a second type, and the RE 300 according to the second type supports both the cellular BS 310 and the WLAN AP 320. At the moment, the RE 300 according to the second type may be a device that integrates the cellular BS 310 and the WLAN AP 320.

According to FIG. 4*b*, the multi-RAT RE 100 may be connected to the RE 300 through at least one of the cellular link or the Wi-Fi link.

Figure 4C:
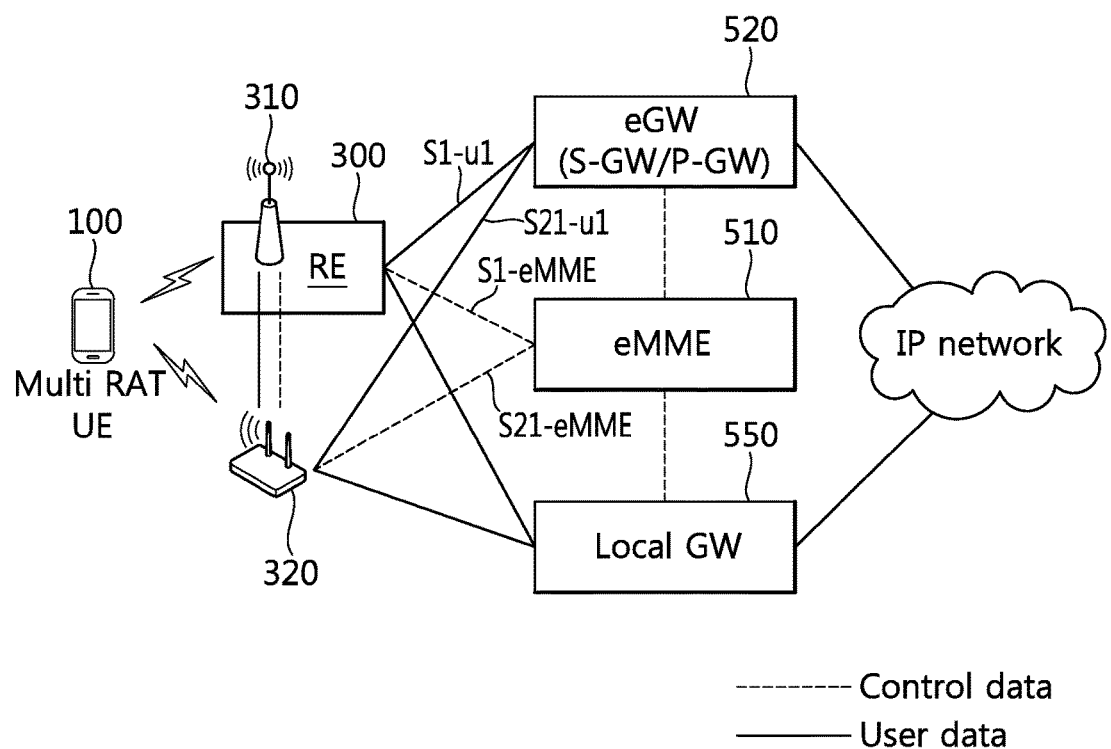

FIG. 4*c* illustrates a concept of RE according to a third type, and the RE 300 according to the third type is integrated within the cellular BS 310. However, there exists an interface between the RE according to the third type and the WLAN AP 320.

As shown in FIG. 4*c*, an interface called S21-U1 may be formed between the WLAN AP 320 and the eGW 520, and an interface called S21-eMME may be formed between the WLAN AP 320 and the eMME 510.

According to FIG. 4*c*, in case that the multi-RAT UE 100 is available to communicate through the Wi-Fi link, a UE may directly access to a core network through the WLAN AP 320, and access to the core network via the RE 300 by using an interface between the WLAN AP 320 and the RE 300.

In case of the RE 300 according to the third type, even though the multi-RAT UE 100 is connected to the WLAN AP 320 through the Wi-Fi link, the RE 300 may be a subject to manage the connection between the WLAN AP 320 and the core network.

Figure 4D:
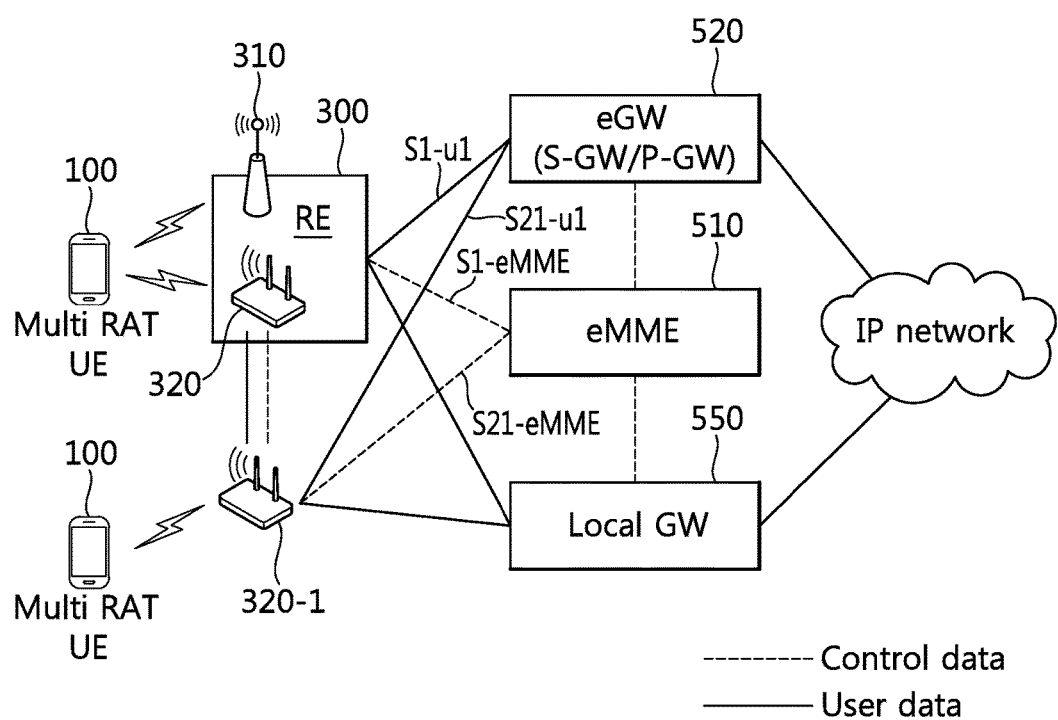

FIG. 4*d* illustrates a concept of RE according to a fourth type, and the RE according to the fourth type has a concept that the RE according to the second type and the RE according to the third type are mixed. That is, the RE 300 according to the fourth type is a device that integrates the cellular BS 310 and the WLAN 320. And an interface may be additionally existed between the RE according to the fourth type and an external WLAN AP 320-1.

As described above, according to the present invention, the RE 300 may be existed in a plurality of types, and the multi-RAT UE 100 may be connected to the RE 300 through at least one of the cellular link and the Wi-Fi link. The multi-RAT UE 100 may access to a core network by being connected to the RE 300 through at least one of the cellular link and the Wi-Fi link, and may access to the core network via the WLAN AP 320 if it is available to communicate through the Wi-Fi link. Or, as described in the third type, the multi-RAT UE 100 may access to the core network via the RE 300 using an interface between the WLAN AP 320 and the RE 300.

Figure 5:
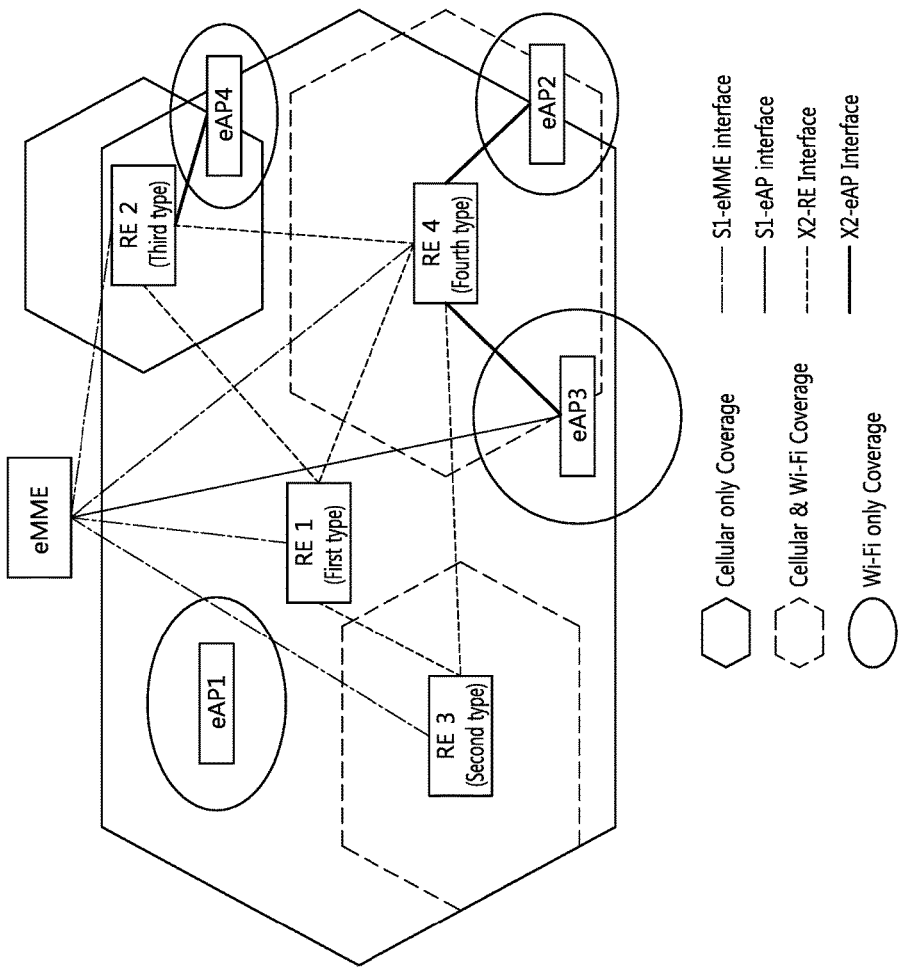
FIG. 5 is a diagram illustrating coverage of different wireless networks according to an embodiment of the present invention.

FIG. 5 is a diagram illustrating coverage of different wireless networks according to an embodiment of the present invention.

Referring to FIG. 5, an eMME forms an S1-eMME interface with four REs (RE 1, RE 2, RE3 and RE 4), and also forms an interface with an eAP 3 that may correspond to the WLAN AP of FIG. 4.

The RE 1 corresponds to the RE of the first type that provides only the cellular interface of FIG. 4*a*, and the RE 2 corresponds to the RE of the second type that forms an X2-eAP interface with being connected to an eAP 4 through the cellular interface.

The RE 3 is a wireless node that supports the cellular interface and the Wi-Fi interface, and corresponds to the third type.

The RE 4 corresponds to the fourth type that forms an interface with being connected to the eAP 3 and the eAP 4 and is also a wireless note that supports the cellular interface and the Wi-Fi interface.

Each of the eAP 1 to the eAP 4 forms Wi-Fi coverage area unilaterally, and the eAP 2 to the eAP 4 forms the X2-AP interface with RE 2 and RE 4, respectively, Since the eAP 3 also forms an S1-dAP interface with the eMME, the eAP 3 is connected to a core network.

Between REs, an X2-RE interface may be formed.

Although it is shown that the sizes of the cellular coverage and the Wi-Fi coverage formed by the RE 3 and the RE 4 are the same for the convenience of description, the sizes may be either the same or different.

As such, as the existing mobile communication network is associated with a hetero network, an interface may be existed for connecting and establishing session between a UE and a core network, or for managing mobility. In case that the function performed by using the existing cellular network is performed through an interface using WLAN, a load of core network may be increased. Accordingly, the function between the WLAN and the core network may be variously configured according to a radio environment or a capability of core network.

That is, according to the function of WLAN that is supportable by the core network, the roles of UE, AP or BS may be differently changed, and the NAS message between the UE and the core network may also be differently modified.

Hereinafter, the function that a UE (multi-RAT device) may perform through a WLAN AP and according to this, the state transit between a UE and a core network will be described.

Table 1 represents a function related to a session management among the functions according to the NAS protocol between a core network and a UE.

TABLE 1

| Classification | Detailed function | Role |
| --- | --- | --- |
| Procedures related to bearer contexts | default EPS bearer context activation | to establish a default EPS bearer context between the UE and the EPC |
| | dedicated EPS bearer context activation | to establish an EPS bearer context with specific QoS and TFT between the UE and the EPC |
| | EPS bearer context modification | to modify an EPS bearer context with a specific QoS and TFT |
| | EPS bearer context deactivation | to deactivate an EPS bearer context or disconnect from a PDN by deactivating all EPS bearer contexts to the PDN |
| Transaction related procedures | PDN connectivity procedure | to request the setup of a default EPS bearer to a PDN |
| | PDN disconnect procedure | to request disconnection from one PDN |
| | bearer resource allocation procedure | to request an allocation of bearer resources for a traffic flow aggregate. |
| | bearer resource modification procedure | to request a modification or release of bearer resources for a traffic flow aggregate or modification of a traffic flow aggregate by replacing packet filters or adding packet filters |
| | ESM information request procedure | to retrieve ESM information, i.e. protocol configuration options, APN, or both from the UE during the attach procedure |
| | ESM status procedure | to report at any time certain error conditions detected upon receipt of ESM protocol data |
| | notification procedure | to inform the UE about events which are relevant for the upper layer which is using an EPS bearer context or has requested a procedure transaction. |

As shown in Table 1, the session management may include procedures related to bearer contexts and transaction related procedures related to performing the procedures.

The procedures related to bearer context may include generating basic EPS bearer context and deleting or modifying this, and the transaction function related to performing the procedures may include packet data network (PDN) related functions such as requesting configuration of basic EPS bearer context to PDN and requesting connection release from PDN, requesting allocating bearer resources for traffic flow, procedures related to modification, and so on.

Table 2 represents functions related to mobility management among the functions according to the NAS protocol between a core network and a UE.

TABLE 2

| Classification | Detailed function | Role |
| --- | --- | --- |
| common procedures | GUTI reallocation | to reallocate a GUTI and optionally to provide a new TAI list |
| | authentication | to initiate authentication of the UE identity |
| | security mode control | to control NAS signalling security |
| | identification | to request the UE to provide the specified identity |
| | EMM information | to send certain information to the UE. |

TABLE 2-continued

| Classification | Detailed function | Role |
| --- | --- | --- |
| specific procedures | attach | |
| | detach | to request the release of an EMM context |

TABLE 2-continued

| Classification | Detailed function | Role |
| --- | --- | --- |
| connection management procedures | tracking area updating | to the network in order to perform an attach procedure |
| | service request | to request the establishment of a NAS signalling connection and of the radio and S1 bearers. |
| | paging procedure | |
| | NAS messages | |

Referring to Table 2, the mobility management may include common procedures, specific procedures, connection management procedures, and so on.

The common procedures may include procedures for performing a Globally Unique Temporary Identifier (GUTI) reallocation, authentication and security related functions. The specific procedures may include procedures related to attach, detach and TA update. And the connection management procedures may include procedures of service request, paging procedures, and so on.

Table 3 represents types of functions that a core network supports through wireless network by the Wi-Fi interface among the various functions shown in Table. 1 and Table. 2.

TABLE 3

| | | Mobility Management | | | | |
|---|---|---|---|---|---|---|
| | Session Management | Common procedures | Specific procedures (FG 1) | Connection management procedures (FG 2) | Note | Function structure type |
| 1 | ○ | X | X | X | UE should be in connected state with RAN and CN | Function structure A |
| 2 | ○ | ○ | X | ○ (re-access function such as service request is applied) | UE should be in Registered state with CN | Function structure B |
| 3 | ○ | X | ○ | ○ | UE should be in Registered state with CN | |
| 4 | ○ | ○ | ○ (only access/registration release functions such as attach and detach are applied) | X | | Function structure C |
| 5 | ○ | ○ | ○ (only access/registration release functions such as attach and detach are applied) | ○ (except Paging) | | Function structure D |
| 6 | ○ | ○ | ○ | X | | Function structure E |
| 7 | ○ | ○ | ○ | ○ | | Function structure F |

According to an embodiment of the present invention, it may be assumed that the session management functions through the Wi-Fi interface shown in Table 3 are supported by the core network basically. That is, it is presumed that a UE is provided with even a minimum amount of data transmission through the Wi-Fi interface.

Since the load related to control that the core network should manage may increase as the functions supported by the core network increase, the functions that can be implemented through the Wi-Fi interface may be managed according to quality and capability of network.

Hereinafter, a function for a specific procedure may be represented as function 1 (FG 1) and a function for a procedure related to connection may be represented as function 2 (FG 2).

Referring to Table 3, the functions for common procedures among the mobility management are not supported by case 1 of function structure type A, but are supported by function structure type B to F.

According to type A, in order for a UE to receive data through the Wi-Fi interface, the state between the UE and the cellular network (Cellular RAN), and the core network (CN) should maintained in the connected state.

The function structure type B does not support the function of specific procedures among the mobility management, and may support case 2 in which only the re-access function such as the service request is supported among the connection management procedures and case 3 in which the connection management procedure mode is supported.

In case of function structure type B, the state between a UE and the core network should be maintained in the registered state. The registered state means that an evolved mobility management (EMM) state among the interface by a NAS protocol between a UE and the core network is in the registered state, and represents that a UE and the core network are logically connected. That is, a UE and the core network should maintain the attach state. However, in function structure type B, data transmission/reception is available even in the idle state, not in the connected state between a UE and the cellular network. This is because a connection related procedure such as a service request by a UE may be performed through the Wi-Fi interface, a cellular module of UE may transmit and receive data even in the idle state, not in the connected state.

Function structure type C represents a function structure in which a part of the common procedures and the specific procedures among the mobility management is supported, but the connection management procedure is not supported. In function structure type C, only access/registration release functions such as attach and detach are supported by the core network among the specific procedures.

Function structure type D represents a function structure in which a part of the common procedures and the specific procedures among the mobility management is supported and the connection management procedure except a paging related procedure is supported.

Function structure type E represents a function structure in which the common procedures and the specific procedures among the mobility management is supported, but the connection related procedure is not supported.

In function structure type F, all functions related to the mobility management shown in Table 2 are supported by the core network.

In case of function structure type C to function structure type F, a UE may transmit and receive data through the Wi-Fi interface without the presumption for the connected state of a UE and a network terminal (wireless node and core network) that is existed for function structure type A and function structure type B.

Hereinafter, the function structure of each type, an access stratum (AS) state corresponding to this, and a NAS state transit according to an operation though the Wi-Fi interface will be described.

Figure 6:
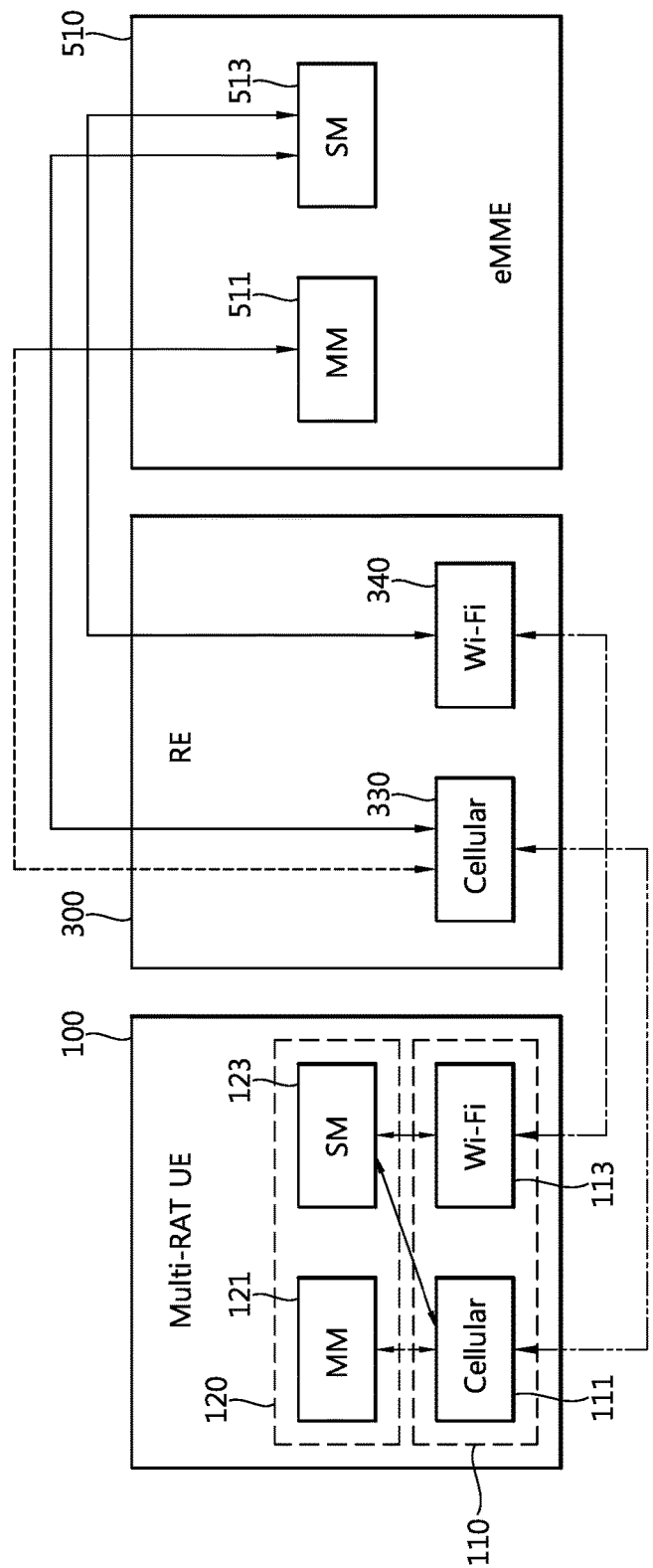
FIG. 6 is a diagram illustrating a function structure of a wireless communication system according to an embodiment of the present invention.

FIG. 6 is a diagram illustrating a function structure of a wireless communication system according to an embodiment of the present invention. Particularly, FIG. 6 shows a function structure in case of function structure type A.

As shown in FIG. 6, a UE (hereinafter, multi-RAT UE; 100) is connected to a RE 300 that corresponds to a wireless node, and the RE 300 is connected to an eMME 510 that corresponds to a network controller within a core network. The multi-RAT UE 100 may be logically or physically connected to the eMME 510 via the RE 300.

Between the multi-RAT UE 100 and the RE 300, a radio access may be established through a radio interface, and a NAS protocol is formed between the multi-RAT UE 100 and the eMME 510.

The multi-RAT UE 100 may include a radio module 110 for an interface with the RE 300 and a core module 120 for an interface with the eMME 510.

The radio module 110 may include a cellular module 111 for a cellular access and a Wi-Fi module 113 for a radio access through the Wi-Fi interface, and the core module 120 may include a mobility management module (MM) 121 and a session management module (SM) 123.

The RE plays a role of interface between the multi-RAT UE 100 and the eMME 510, and may include a cellular module 330 and a Wi-Fi module 340 which are connected to the radio module of the multi-RAT UE 100.

The cellular module 330 of the RE 300 may perform a wireless communication by being connected to the cellular module 111 of the multi-RAT UE 100, and the Wi-Fi module 340 of the RE 300 may perform a wireless communication by being connected to the Wi-Fi module 113 of the multi-RAT UE 100.

The cellular module 330 of the RE 300 may correspond to the BS of FIG. 4, and the Wi-Fi module 340 may include an AP that is collocated or connected to the RE. That is, the cellular module 330 and the Wi-Fi module 340 may correspond to wireless nodes that perform a wireless communication with the multi-RAT UE 100 through a radio interface.

The eMME 510 may include a mobility management module 511 that supports the mobility management function and a session management module 513 that supports the session management function.

In case of function structure type A, the function related to the session management may be performed through the cellular interface and the Wi-Fi interface. Accordingly, the session management module 123 of the multi-RAT UE 100 may be connected to both the cellular module 111 and the Wi-Fi module 113, and the session management module 513 of the eMME 510 may also be connected to both the cellular module 330 and the Wi-Fi module 340.

On the other hand, since the function related to the mobility management is supported only by the cellular interface, the mobility management module 121 of the multi-RAT UE 100 is connected to the cellular module 111, but not connected to the Wi-Fi module 113.

This is because the mobility management module 511 of the eMME 510 does not support the Wi-Fi interface, and it is identified by FIG. 6, the mobility management 511 is connected only to the cellular module 330 of the RE 300.

Figure 7:
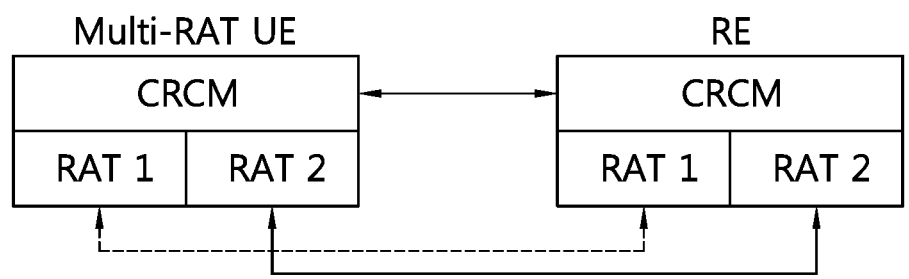
FIG. 7 is a diagram for describing a CRCM state between a UE and a RE according to an embodiment of the present invention.
Figure 8:
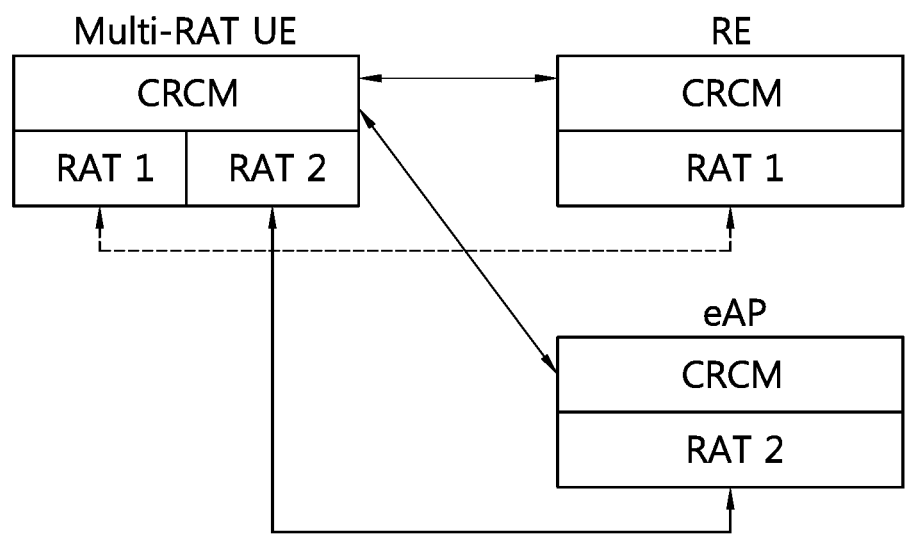
FIG. 8 is a diagram for describing a CRCM state between a UE and a RE according to another embodiment of the present invention.

FIG. 7 and FIG. 8 are diagrams for describing a CRCM state between a UE and a RE according to an embodiment of the present invention.

FIG. 7 shows a case that a RE is the second type shown in FIG. 4b, and FIG. 8 shows a case that a RE is the third type shown in FIG. 4c.

As shown in FIG. 7 and FIG. 8, a multi-RAT UE may be connected to a RE via a first RAT (RAT 1), and connected to a RE via a second RAT (RAT 2). According to an example of the present invention, the first RAT may mean a radio access through the cellular network, and the second RAT may mean a radio access through the Wi-Fi network.

Such a radio access state may be switched from the connected state to the idle state in case of being released, being disassociated, a radio link failure or user data inactivity.

Hereinafter, in the present invention, a module that manages a connection between the multi-RAT UE and the RE with being changed between the activated state and the deactivated state may be defined as a common radio connection management (CRCM) according to the connection state between the multi-RAT UE and the RE.

In case that the radio access shown in FIG. 7 and FIG. 8 is established and function structure type A is applied, only in case of the connected state that the multi-RAT UE is connected to the first RAT, the CRCM is in the activated state.

Table 4 represents a CRCM state between the multi-RAT UE and the RE according to function structure type A.

TABLE 4

| CRCM's State | RAT 1's State | RAT 2's State |
| --- | --- | --- |
| Deactivated | Idle | Idle |
| Deactivated | Idle | Connected |
| Activated | Connected | Idle |
| Activated | Connected | Connected |

Referring to Table 4, in case of the idle state in which both the first RAT and the second RAT are not connected, the CRCM is in the deactivated state, and in case of the connected state in which both the first RAT and the second RAT are connected, the CRCM is in the activated state.

Meanwhile, even though the second RAT is in the connected state, if the first RAT is in the idle state, the CRCM is in the deactivated state. This is because the mobility management function between the multi-RAT UE and the core network is not supported through the Wi-Fi interface, and the CRCM state linked to a state of the mobility management module of the eMME cannot be in the activated state.

That is, the CRCM in case of function structure type A is in the activated state only in case that a radio access through the cellular interface is established, and the CRCM state and the connection state between the eMME and the multi-RAT UE is interconnected.

Meanwhile, as shown in FIG. 8, in case that the multi-RAT UE is in the state connected to a plurality of radio access devices, for example, RE or AP, the CRCM may be managed by a specific device, the RE of FIG. 4.

Figure 9:
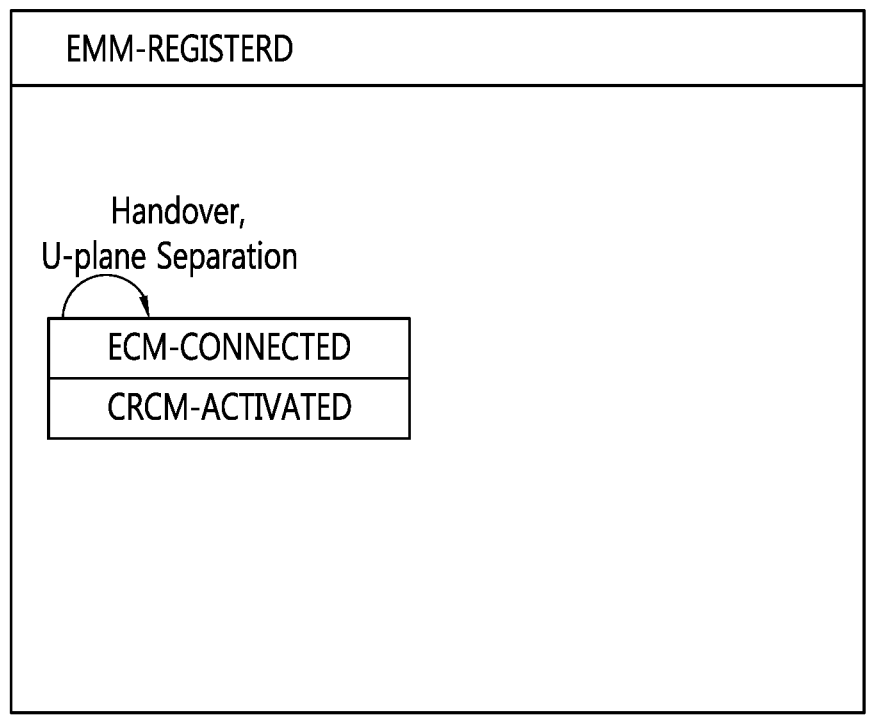
FIG. 9 is a diagram illustrating a state according to a NAS protocol according to an embodiment of the present invention.

FIG. 9 is a diagram illustrating a state according to a NAS protocol according to an embodiment of the present invention. Particularly, FIG. 9 shows a state of a UE and a core network through a NAS protocol in case of function structure type A.

Between a multi-RAT UE and a core network, an interface through the NAS protocol may be formed, which may be described by a state of an evolved connection management (ECM) and an evolved mobility management (EMM) shown in FIG. 9. A state of the EMM may be described with the mobility management module 121 of the multi-RAT UE 100 and the mobility management module 511 of the eMME 510 shown in FIG. 6.

The case that the ECM is in the connection state may mean the multi-RAT UE and the core network are physically connected, and the case that the EMM is in the registered state may represent that the multi-RAT UE and the core network are not physically connected but logically connected since the eMME stores the context of the multi-RAT UE.

The ECM state of the multi-RAT UE and the eMME may be changed by being coupled to the CRCM state shown in Table 4. That is, if the CRCM state is in the activated state, the ECM may be switched from the idle state to the connected state, and if the CRCM is in the deactivated state, the ECM may be switched from the connected state to the idle state.

In case of function structure type A, as far as the connection state of the multi-RAT UE and the RE is maintained, the EMM is maintained in the registered state. In this state, even though handover or user plane separation (U-plane separation) occurs, an additional state transit does not occur.

In case of function structure type A, the ECM is coupled to the state of CRCM, and the CRCM is linked to the EMM. If the CRCM is in the activated state, the ECM is in the connected state, and the EMM is in the registered state, the multi-RAT UE may perform the function related to session through the Wi-Fi interface.

Table 5 represents a CRCM state between the multi-RAT UE and the RE according to function structure types B, C, D, E and F.

TABLE 5

| CRCM's State | RAT 1's State | RAT 2's State |
|---|---|---|
| Deactivated | Idle | Idle |
| Activated | Idle | Connected |
| Activated | Connected | Idle |
| Activated | Connected | Connected |

According to Table 5, except the case that both of the first RAT and the second RAT are in the idle state, that is, if either any one of the first RAT or the second RAT is in the connected state, the CRCM is in the activated state.

The state of RAT may be switched from the connected state to the idle state in case that the wireless connection state is released and/or disassociated, or in case of radio link failure or user inactivity.

Figure 10:
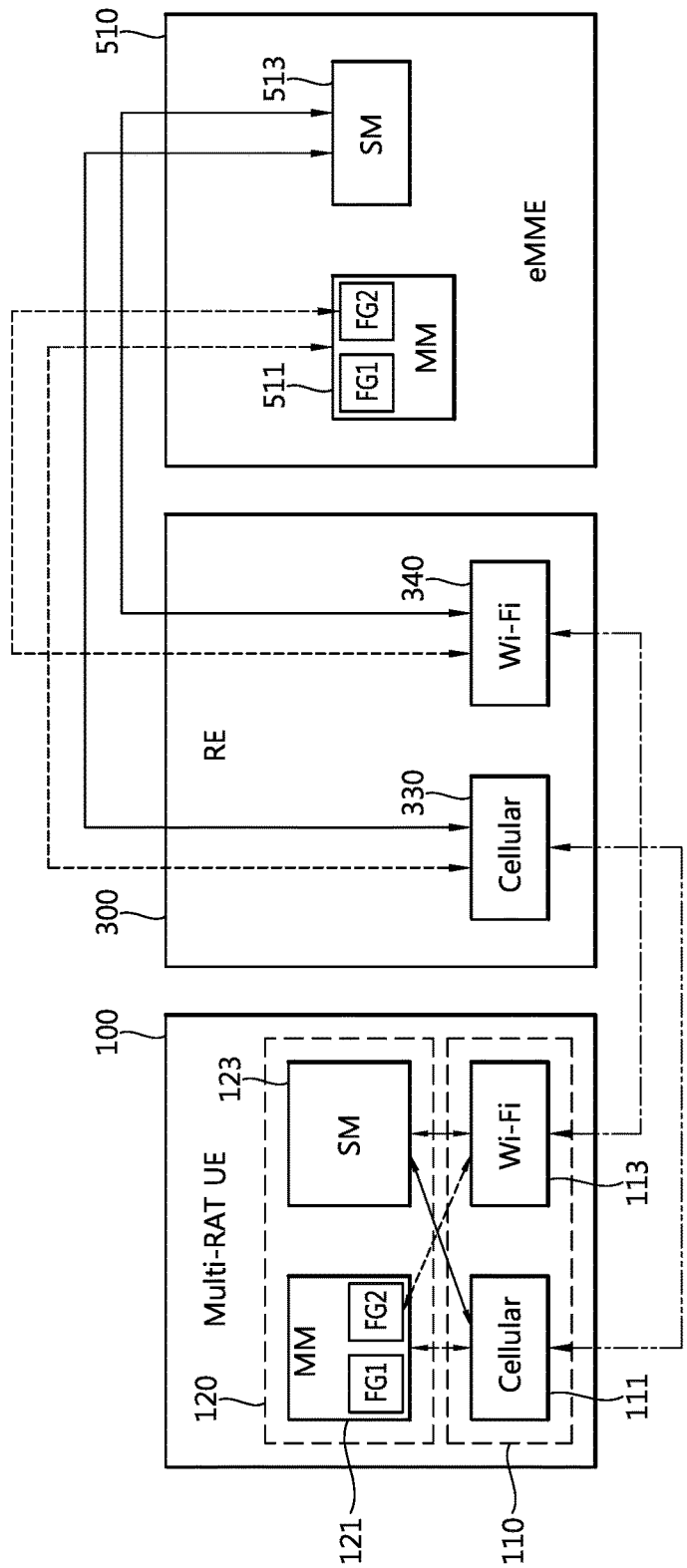
FIG. 10 is a diagram illustrating a function structure of a wireless communication system according to another embodiment of the present invention.

FIG. 10 is a diagram illustrating a function structure of a wireless communication system according to another embodiment of the present invention. Particularly, FIG. 10 shows a function structure in case of function structure type B.

As shown in FIG. 10, in case of function structure type B, function 1 among the functions by a mobility management module may be performed by the cellular module 111, and function 2 may be performed by the Wi-Fi module 113.

This has the same context as the mobility management module 511 of the eMME 510 supports function 1 through the cellular module 330 and supports function 2 through the Wi-Fi module 340.

As shown in FIG. 10, the session related function is supported through the cellular interface and the Wi-Fi interface.

Figure 11:
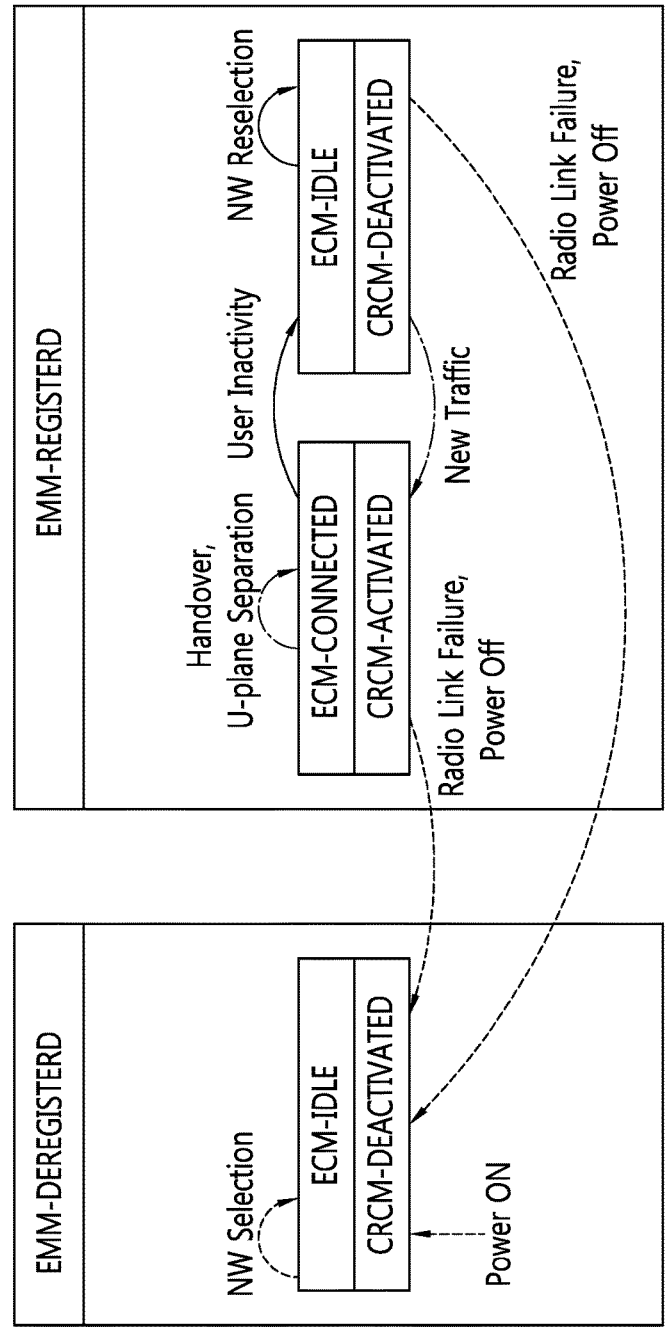
FIG. 11 is a diagram illustrating a state transit according to a NAS protocol according to another embodiment of the present invention.

FIG. 11 is a diagram illustrating a state transit according to a NAS protocol according to another embodiment of the present invention. FIG. 11 shows a state transit that may be occurred when the session related function and the mobility related function are performed through the Wi-Fi interface in case of function structure type B.

In case of function structure type B, all functions of function 2 are supported through the Wi-Fi interface or only a re-access function such as a service request of function 2 is supported.

As shown in FIG. 11, in case that the ECM is in the idle state, the CRCM is in the deactivated state, and the EMM is in the deregistered state, power may be supplied or network may be selected. In case that the EMM is in the deregistered state, a core network may not detect the existence of multi-RAT UE.

If the EMM is also in the registered state, an additional state transit does not occur even though handover or user plane separation occurs in this state. In case of function structure type B, attach for the EMM to switch from the deregistered state to the registered state may not performed through the Wi-Fi interface.

While the EMM is in the registered state, if radio link failure or power off occurs, the EMM is changed to the deregistered state, and the ECM and the CRCM are also switched to the idle state and the deactivated state.

While the EMM is in the registered state, the ECM is in the connected state, and the CRCM is in the activated state, if user inactivity occurs, the ECM is switched from the connected state to the idle state, and the CRCM is switched from the activated state to the deactivated state. However, even in this case, the state of the EMM is maintained in the registered state.

If new traffic is generated, the ECM may be switched from the idle state to the connected state again, and the CRCM may be switched from the deactivated state to the activated state.

In case of radio link failure during an event that the EMM is switched from the registered state to the deregistered state, a state transit does not occur if any one of a plurality of RATs is connected to a radio link. That is, the state transit owing to the radio link failure of any one RAT among the plurality of RATs does not occur.

Figure 12:
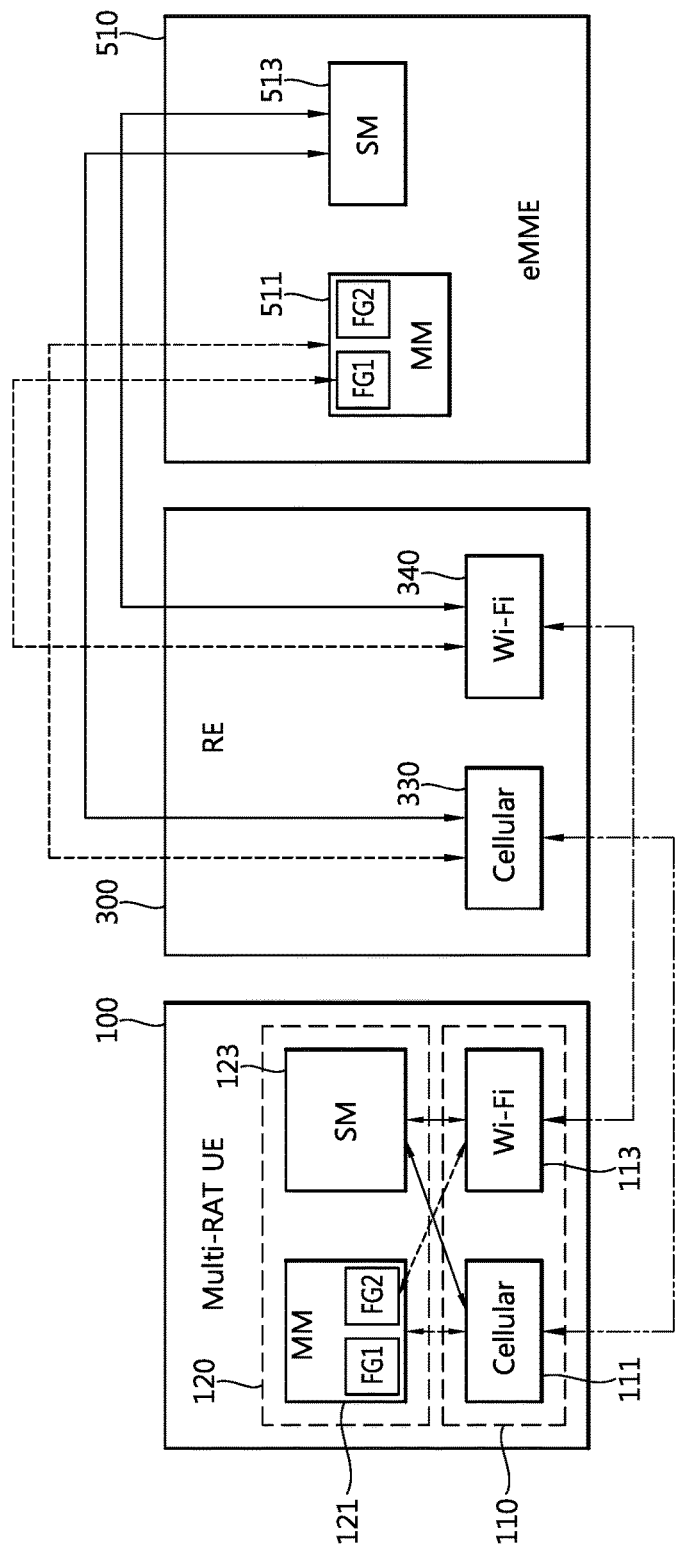
FIG. 12 is a diagram illustrating a function structure of a wireless communication system according to another embodiment of the present invention.

FIG. 12 is a diagram illustrating a function structure of a wireless communication system according to another embodiment of the present invention. Particularly, FIG. 12 shows a function structure in case of function structure type C and function structure type E.

As shown in FIG. 12, in case of function structure type C and function structure type E, function 1 among the functions by the mobility management module may be performed by the Wi-Fi module 113, but function 2 may not be performed by the Wi-Fi module 113. Function 1 may also be performed by the cellular module 111.

This may be identified by the fact that the mobility management module 511 of the eMME 510 is connected to the mobility management module 121 of the multi-RAT UE 100 through the cellular interface, and function 1 is supported by the cellular module 330 and the Wi-Fi module 340, but function 2 is not supported through the Wi-Fi interface.

As shown in FIG. 12, the session related function is supported through the cellular interface and the Wi-Fi interface.

Figure 13:
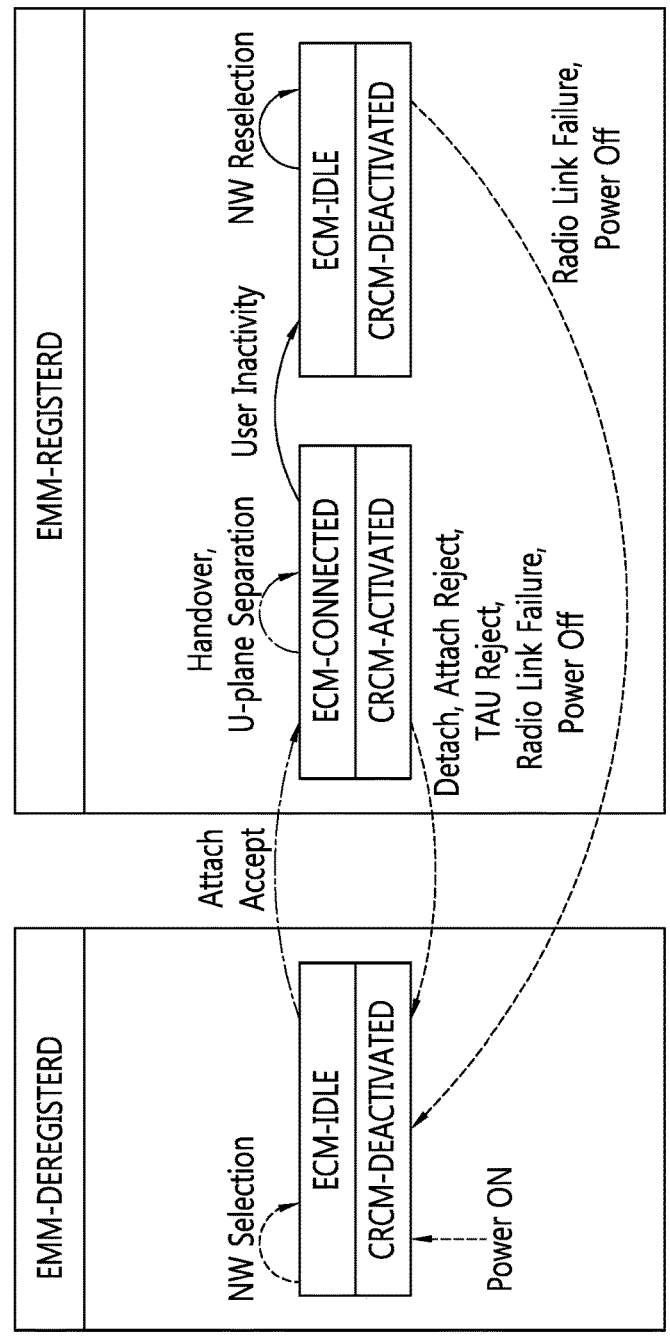
FIG. 13 is a diagram illustrating a state transit according to a NAS protocol according to another embodiment of the present invention.

FIG. 13 is a diagram illustrating a state transit according to a NAS protocol according to another embodiment of the present invention. FIG. 13 shows a state transit that may be occurred when the session related function and the mobility related function are performed through the Wi-Fi interface in case of function structure type C.

In case of function structure type C, only access/registration release functions such as attach and detach among function 1 are supported through the Wi-Fi interface.

As shown in FIG. 13, in case that the ECM is in the idle state, the CRCM is in the deactivated state, and the EMM is in the deregistered state, power may be supplied or network may be selected. In case that the EMM is in the deregistered state, a core network may not detect the existence of multi-RAT UE.

If attach is accepted, the ECM is switched to the connected state, and the CRCM is switched to the activated state. In addition, the EMM is also switched to the registered state. An additional state transit does not occur even though handover or user plane separation occurs in this state.

While the EMM is in the registered state, if detach or attach is rejected, radio link failure or power off occurs, the EMM is changed to the deregistered state, and the ECM and the CRCM are also switched to the idle state and the deactivated state.

While the EMM is in the registered state, the ECM is in the connected state, and the CRCM is in the activated state, if user inactivity occurs, the ECM is switched from the connected state to the idle state, and the CRCM is switched from the activated state to the deactivated state. However, even in this case, the state of the EMM is maintained in the registered state.

In case of radio link failure during an event that the EMM is switched from the registered state to the deregistered state, a state transit does not occur if any one of a plurality of RATs is connected to a radio link. That is, the state transit owing to the radio link failure of any one RAT among the plurality of RATs does not occur.

Figure 14:
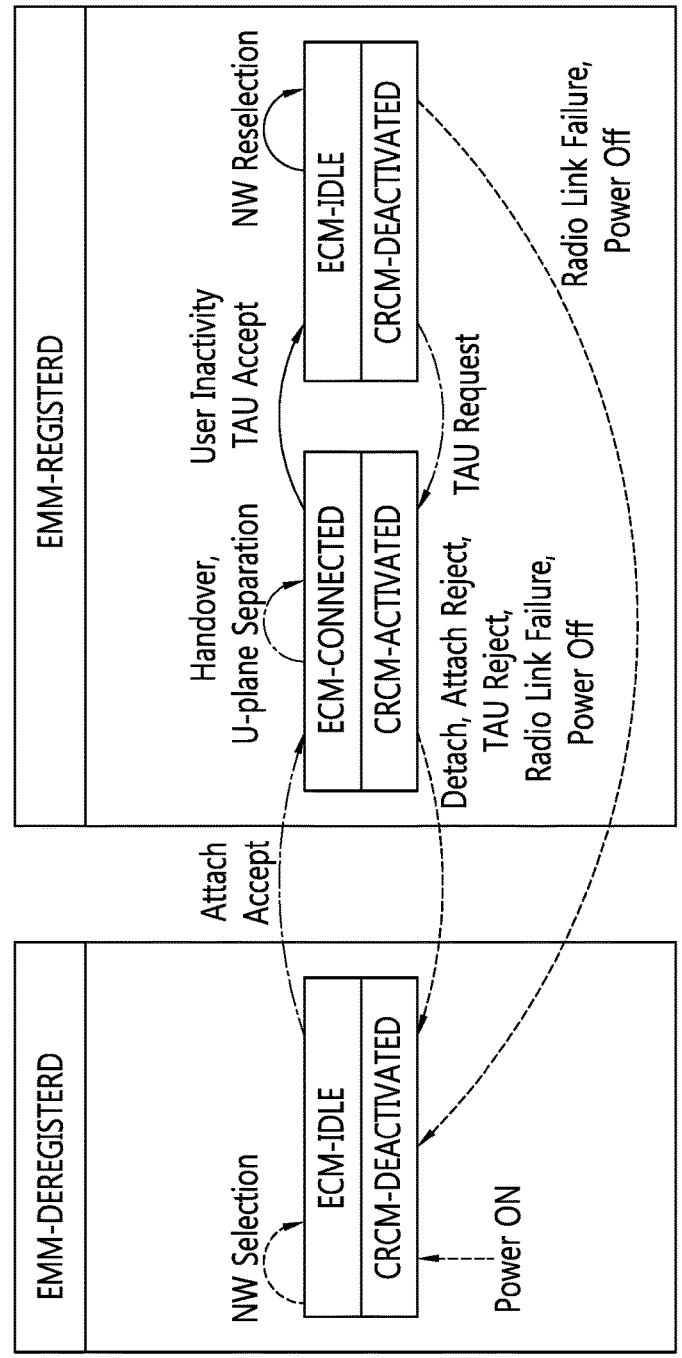
FIG. 14 is a diagram illustrating a state transit according to a NAS protocol according to another embodiment of the present invention.

FIG. 14 is a diagram illustrating a state transit according to a NAS protocol according to another embodiment of the present invention. FIG. 14 shows a state transit that may be occurred when the session related function and the mobility related function are performed through the Wi-Fi interface in case of function structure type E.

In case of function structure type E, all functions of function 1 is supported through the Wi-Fi interface, but function 2 is not supported. That is, in function structure type E, a multi-RAT UE may perform functions related to attach, detach and TA update through the Wi-Fi interface, but may not perform the paging related function.

In case that the ECM is in the idle state, the CRCM is in the deactivated state, and the EMM is in the deregistered state, power may be supplied or network may be selected. In case that the EMM is in the deregistered state, a core network may not detect the existence of multi-RAT UE.

If attach is accepted, the ECM is switched to the connected state, and the CRCM is switched to the activated state. In addition, the EMM is also switched to the registered state. An additional state transit does not occur even though handover or user plane separation occurs in this state.

While the EMM is in the registered state, if detach or attach is rejected, or TAU is rejected, or radio link failure or power off occurs, the EMM is changed to the deregistered state, and the ECM and the CRCM are also switched to the idle state and the deactivated state.

While the EMM is in the registered state, the ECM is in the connected state, and the CRCM is in the activated state, if user inactivity occurs or the TAU is accepted, the ECM is switched from the connected state to the idle state, and the CRCM is switched from the activated state to the deactivated state. However, even in this case, the state of the EMM is maintained in the registered state.

If a request for the TAU occurs, the ECM may be switched from the idle state to the connected state again, and the CRCM may be switched from the deactivated state to the activated state.

In case of radio link failure during an event that the EMM is switched from the registered state to the deregistered state, a state transit does not occur if any one of a plurality of RATs is connected to a radio link. That is, the state transit owing to the radio link failure of any one RAT among the plurality of RATs does not occur.

Figure 15:
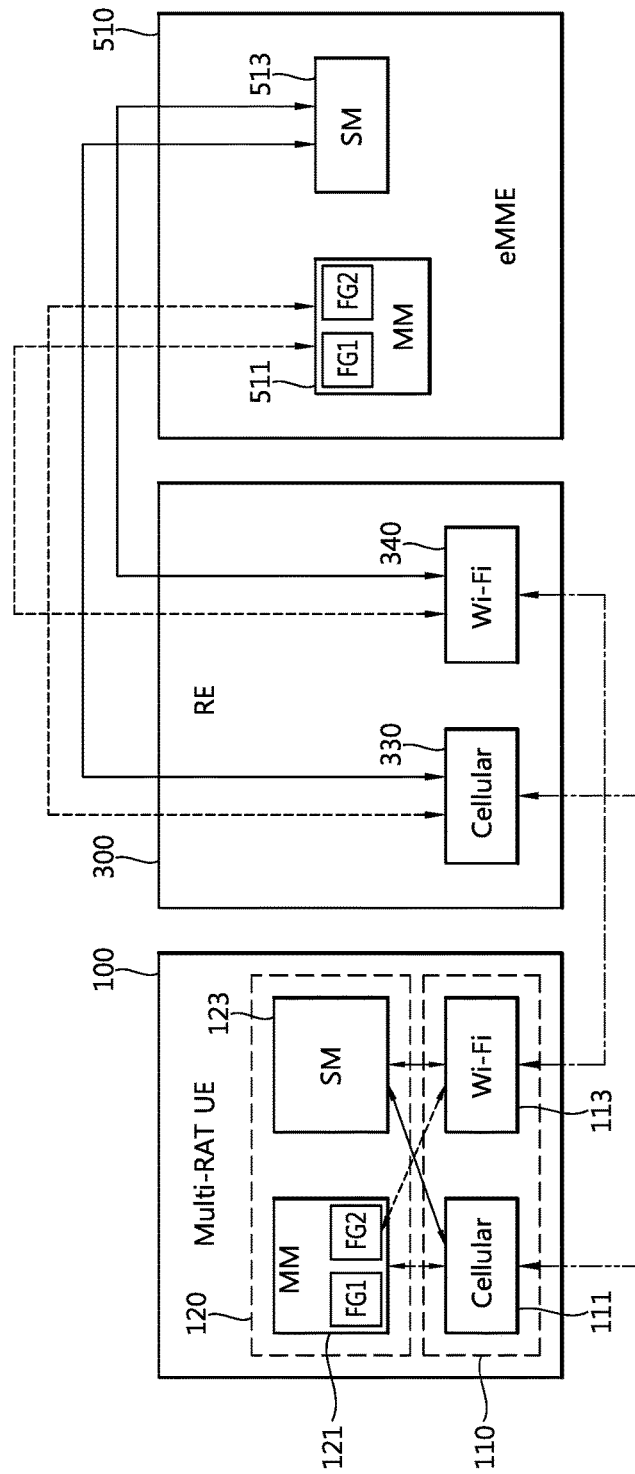
FIG. 15 is a diagram illustrating a function structure of a wireless communication system according to another embodiment of the present invention.

FIG. 15 is a diagram illustrating a function structure of a wireless communication system according to another embodiment of the present invention. Particularly, FIG. 15 shows a function structure in case of function structure type D and function structure type F.

As shown in FIG. 15, in case of function structure type D and function structure type F, both of function 1 and function 2 among the functions by the mobility management module may be performed by the Wi-Fi module 113 and the cellular module 111.

This may be identified by the fact that the mobility management module 511 of the eMME 510 is connected to the cellular module 111 and the Wi-Fi module 113 of the multi-RAT UE 100 through the cellular module 330 and the Wi-Fi module 340 of the RE 300.

As shown in FIG. 15, the session related function is supported through the cellular interface and the Wi-Fi interface.

Figure 16:
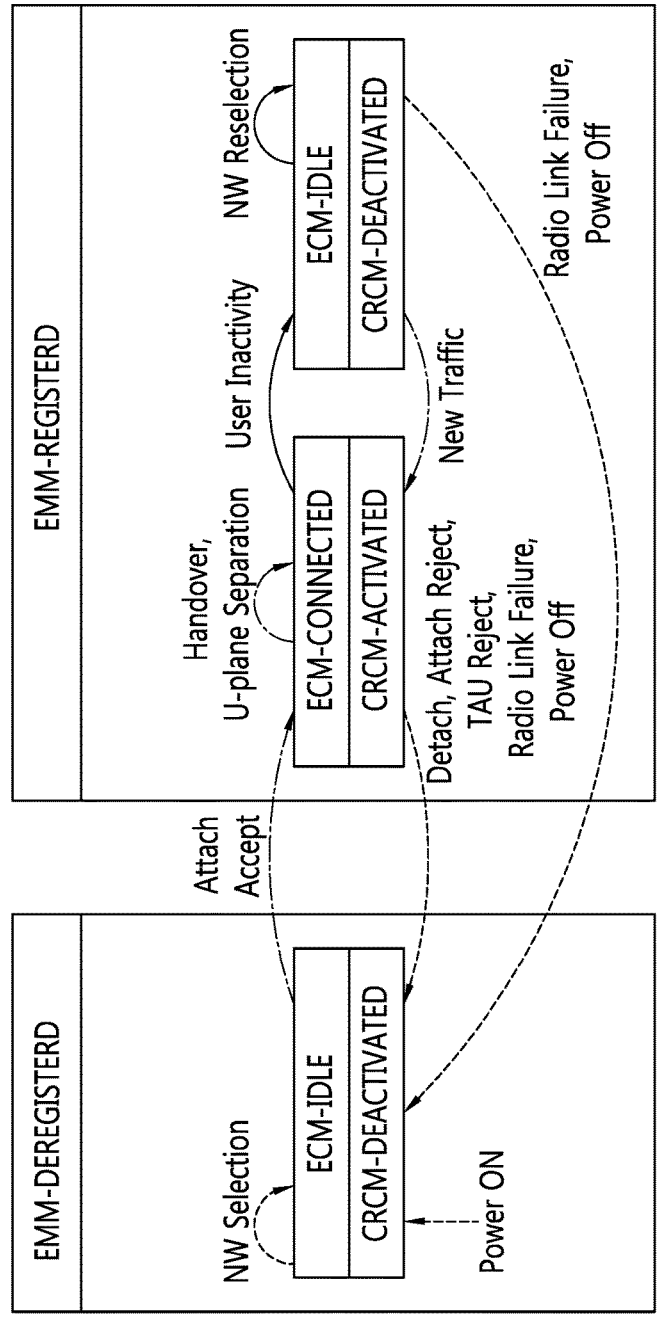
FIG. 16 is a diagram illustrating a state transit according to a NAS protocol according to another embodiment of the present invention.

FIG. 16 is a diagram illustrating a state transit according to a NAS protocol according to another embodiment of the present invention. FIG. 16 shows a state transit that may be occurred when the session related function and the mobility related function are performed through the Wi-Fi interface in case of function structure type D.

In case of function structure type D, only access/registration release functions such as attach and detach among function 1 may be supported through the Wi-Fi interface, and the paging related function among function 2 may be performed.

In case that the ECM is in the idle state, the CRCM is in the deactivated state, and the EMM is in the deregistered state, power may be supplied or network may be selected. In case that the EMM is in the deregistered state, a core network may not detect the existence of multi-RAT UE.

If attach is accepted, the ECM is switched to the connected state, and the CRCM is switched to the activated state. In addition, the EMM is also switched to the registered state. An additional state transit does not occur even though handover or user plane separation occurs in this state.

While the EMM is in the registered state, if detach or attach is rejected, radio link failure or power off occurs, the EMM is changed to the deregistered state, and the ECM and the CRCM are also switched to the idle state and the deactivated state.

While the EMM is in the registered state, the ECM is in the connected state, and the CRCM is in the activated state, if user inactivity occurs, the ECM is switched from the connected state to the idle state, and the CRCM is switched from the activated state to the deactivated state. However, even in this case, the state of the EMM is maintained in the registered state.

If new traffic occurs, the ECM may be switched from the idle state to the connected state again, and the CRCM may be switched from the deactivated state to the activated state.

In case of radio link failure during an event that the EMM is switched from the registered state to the deregistered state, a state transit does not occur if any one of a plurality of RATs is connected to a radio link. That is, the state transit owing to the radio link failure of any one RAT among the plurality of RATs does not occur.

Figure 17:
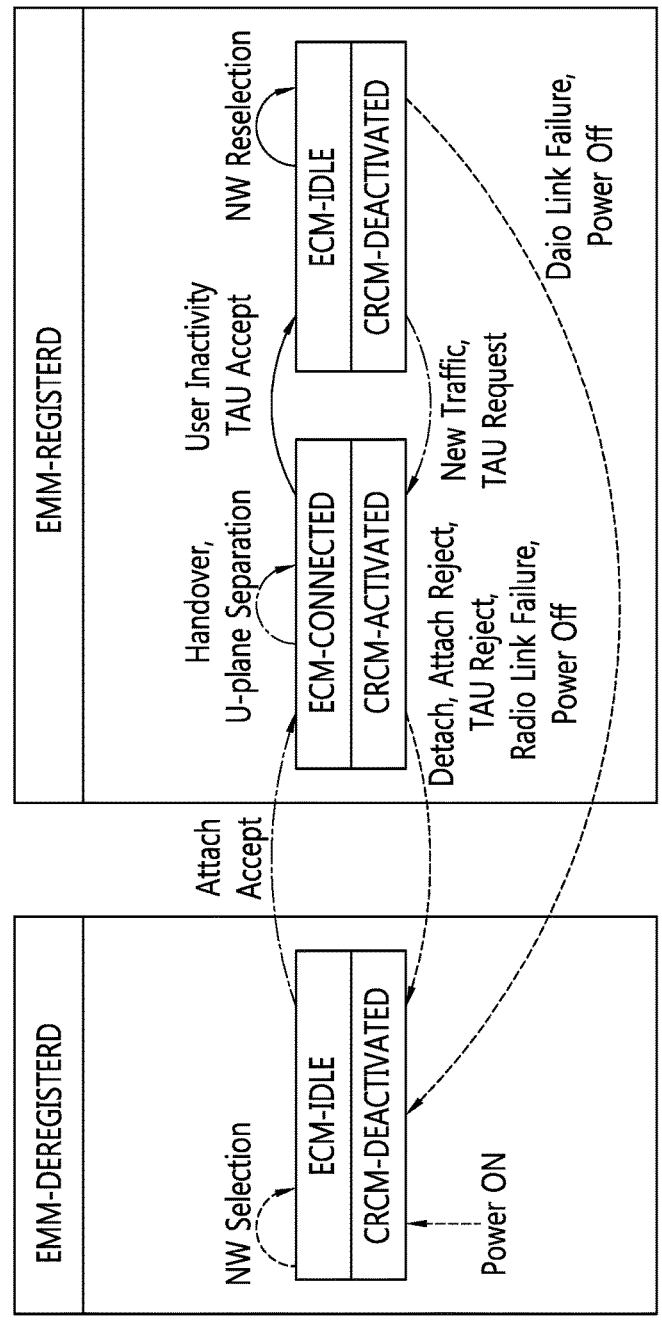
FIG. 17 is a diagram illustrating a state transit according to a NAS protocol according to another embodiment of the present invention.

FIG. 17 is a diagram illustrating a state transit according to a NAS protocol according to another embodiment of the present invention. FIG. 17 shows a state transit that may be occurred when the session related function and the mobility related function are performed through the Wi-Fi interface in case of function structure type F.

In case of function structure type F, both of the mobility related function and the session related function may be performed through the Wi-Fi interface.

In case that the ECM is in the idle state, the CRCM is in the deactivated state, and the EMM is in the deregistered state, power may be supplied or network may be selected. In case that the EMM is in the deregistered state, a core network may not detect the existence of multi-RAT UE.

If attach is accepted, the ECM is switched to the connected state, and the CRCM is switched to the activated state. In addition, the EMM is also switched to the registered state. An additional state transit does not occur even though handover or user plane separation occurs in this state.

While the EMM is in the registered state, if detach or attach is rejected, or TAU is rejected, or radio link failure or power off occurs, the EMM is changed to the deregistered state, and the ECM and the CRCM are also switched to the idle state and the deactivated state.

While the EMM is in the registered state, the ECM is in the connected state, and the CRCM is in the activated state, if user inactivity occurs or the TAU is accepted, the ECM is switched from the connected state to the idle state, and the CRCM is switched from the activated state to the deactivated state. However, even in this case, the state of the EMM is maintained in the registered state.

If new traffic is generated or a request for the TAU occurs, the ECM may be switched from the idle state to the connected state again, and the CRCM may be switched from the deactivated state to the activated state.

In case of radio link failure during an event that the EMM is switched from the registered state to the deregistered state, a state transit does not occur if any one of a plurality of RATs is connected to a radio link. That is, the state transit owing to the radio link failure of any one RAT among the plurality of RATs does not occur.

As such, in different RAT environments, a UE may perform operations proper to its own situation. In this case, for the operation of UE, it is required to newly define system information (hereinafter, SI) transmitted to an AP.

Such SI may include Wi-Fi AP type information.

The AP type includes a first type (Legacy AP) that represents the previous AP in which an interface with a core network through a NAS is not formed, a second type (Physically collocated AP with RE) that represents an AP collocated with the RE shown in FIG. 4b, a third type (Physically connected AP to RE) that represents an AP connected to the RE shown in FIG. 4c and a fourth type (Hybrid AP) that represents an AP in which the second type and the third type are combined.

In addition, the SI may include information (hereinafter, function type information) of core function structure type that may be acquired during the process of setup an interface (e.g., S1-eAP and X2-eAP) with an eMME or a RE.

This is designed to distinguish the function that is supported through the Wi-Fi interface shown in Table 3, and a multi-RAT UE may detect which function is to be performed through the information of function structure type by itself.

For example, if the function type information is '000' or setup to be '000' in case of not acquiring the function type information explicitly, this may represent that any function of Table 3 is not available to be performed through a Wi-Fi AP. If the function type information is '001', which represents function structure type A of Table 3, and if the function type information is '010', which represents function structure type B of Table 3. If the function type information is '011', which represents function structure type C of Table 3, and if the function type information is '100', which represents function structure type D of Table 3. If the function type information is '101', which represents function structure type E of Table 3, and if the function type information is '111', which represents function structure type F of Table 3.

In addition, the SI may include a tracking area (TA) code that is acquired during the configuration process of an interface (e.g., S1-eAP and X2-eAP) with an eMME or a RE.

As such the SI is transmitted to a multi-RAT UE, the multi-RAT UE may perform the mobility management related procedure and the session management related procedure that are allowed through the Wi-Fi interface according to the core function type information which is received by the SI.

At the moment, although the AP type is not the first type (Legacy AP) but if the core function structure type is '000', that is, although the cellular interface and the Wi-Fi interface may operate based on a unified core network, but if the function of Table 3 is not available to be performed using the Wi-Fi interface, the multi-RAT UE accesses the cellular network and should switch the radio access state to the connected state, and the state of core network should also be switched to the connected state so as to transmit and receive user data.

In addition, if there is no direct interface between an eMME and an AP (e.g., in case that an AP is indirectly connected to a RE or a wireless node for cellular access), and if the function structure type is either A or B, the eMME should identify from which UE is sent the transmitted session management related message.

For this, according to an example, the ID allocated to the multi-RAT UE may be applied. For example, an eMME may distinguish a multi-RAT UE by using identification information (S1AP ID) between a wireless node such as a BS and the eMME, identification information (X2-eAP ID) between an AP and a wireless node such as a BS, identification information (MAC address in 802.11 MAC frame) between the multi-RAT UE and an AP, and so on.

According to another embodiment, from which UE sent the session management related message may be identified by utilizing security context related parameter. For example, signals such as a Type of security context flag, a NAS key set identifier and a NAS COUNT may be transmitted and received between a multi-RAT UE and an eMME, and a path of the session management related message may be detected by the whole or a part of the signals.

Figure 18:
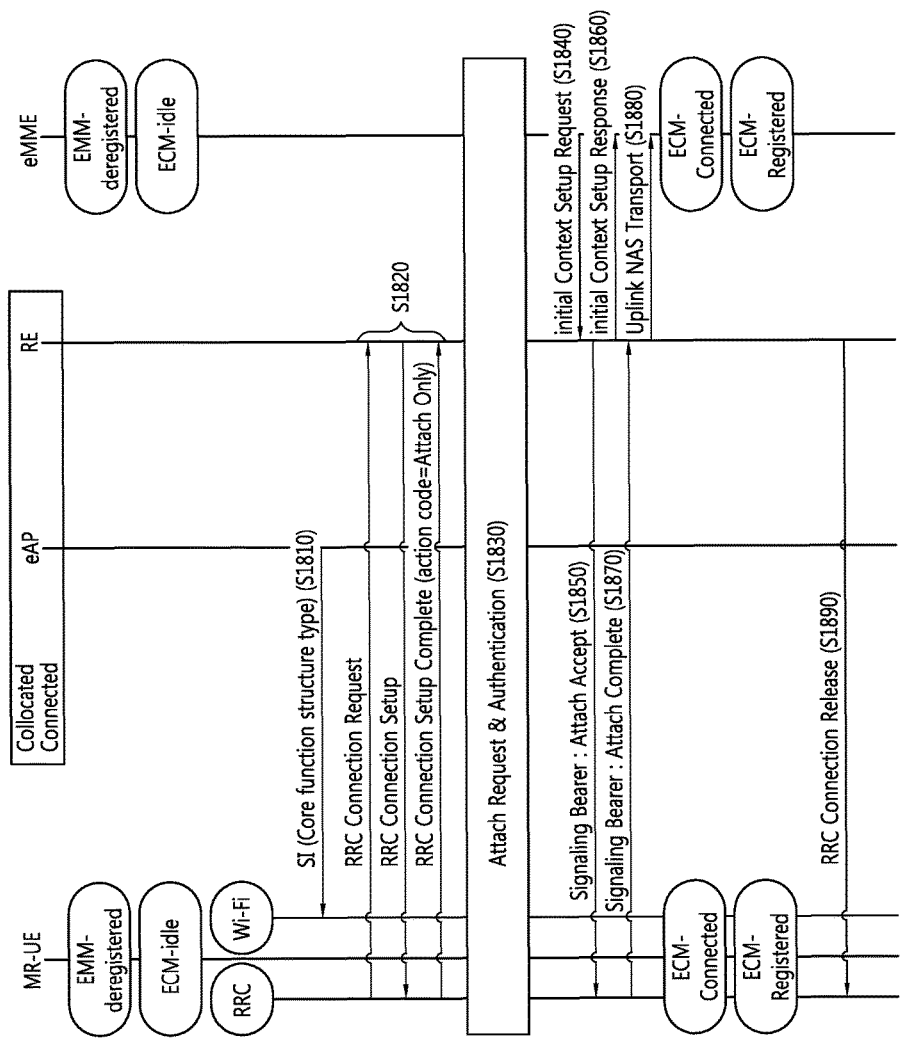
FIG. 18 is a control flowchart for describing an attach process between a UE and a core network according to an embodiment of the present invention.

FIG. 18 is a control flowchart for describing an attach process between a UE and a core network according to an embodiment of the present invention.

FIG. 18 illustrates a process that a UE attaches to a core network in case of transmitting data through the Wi-Fi interface, which is a hetero network, in the previous AP structure or function structure type A or B of Table 3. That is, according to FIG. 18, data are not transmitted through the cellular interface.

First, a UE may receive the SI that includes information of core function structure type (step, S1810).

The UE may request a message for a radio resource control (RRC) connection (RRC connection request), and receive a connection setup message for this (RRC Connection Setup), and then, complete a RRC connection setup (RRC Connection Setup Complete) (step, S1820).

The UE may transmit the RRC connection request message in which an establishment cause is setup as a mobile originated (MO)-signaling transmitted from the UE to a RE.

The RRC connection setup completion may be signaled by specific information, for example, code information such as 'action code=Attach Only' that the setup is only for attach. That is, the UE may notify that the UE performs only attach to the RE in the process of setup a RRC connection.

The UE may request attach and authentication process (Attach Request & Authentication) for network registration through the cellular link for transmitting data to an eMME (step, S1830).

The eMME may transmit an initial context setup request message to the RE (step, S1840), and the RE perform signaling a bearer of attach acceptance (Attach Accept) to the UE according to such an initial context setup request message (step, S1850) and transmit an initial context setup response message to the eMME (step, S1860).

The initial context setup request message may include E-RAB ID, QoS, NAS-PDU: Attach Accept, and so on, and the initial context setup response message may include information that notifies the E-RAB ID and the RRC state are in the idle state.

The UE may perform signaling a bearer for attach complete to the RE in response to the received bearer signaling from the RE (step, S1870), and the RE that receives this may transmit Uplink NAS Transport (NAS-PDS: Attach complete) to the eMME (step, S1880).

As such, when the RRC connection for attach is completed, the ECM of the UE and the eMME is switched to the connected state, and the EMM is switched to the registered state.

If the attach process is completed, the RE may release the RRC connection state (RRC Connection Release) (step, S1890).

Figure 19:
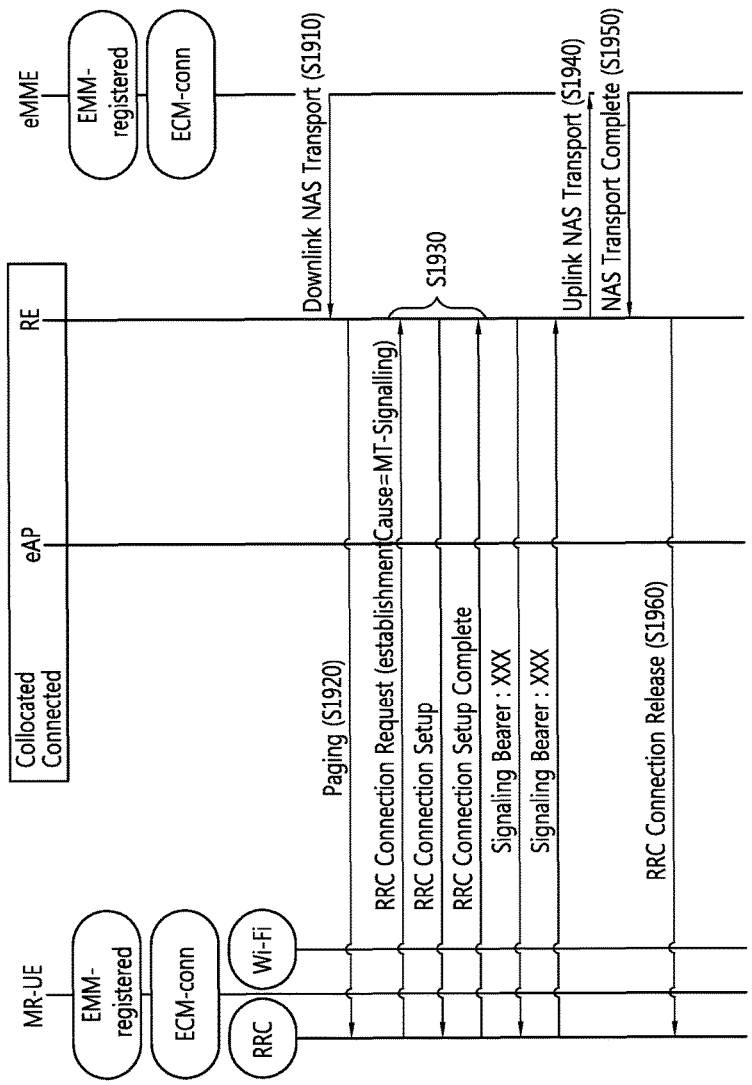
FIG. 19 is a control flowchart for describing NAS signaling between a UE and a core network according to an embodiment of the present invention.

FIG. 19 is a control flowchart for describing NAS signaling between a UE and a core network according to an embodiment of the present invention.

FIG. 19 also illustrates a process that a UE attaches to a core network in case that it is required to downlink a NAS message such as security update, reallocation and EMM information, in the previous AP structure or function structure type A or B of Table 3. The paging for downlink of the NAS signaling as well as the data downlink may be required. In the embodiment, in case that a RRC connection is required for such a paging, mobile terminated (MT) signaling transmitted to a UE may be newly added.

As a presumption that it is available to downlink the NAS signaling, the ECM of a UE and an eMME is in the connected state, and the EMM is in the registered state.

The eMME transmits Downlink NAS Transport to a RE according to the above described reason (step, S1910), and the RE that receives this transmits a paging message for downlink of the NAS signaling to the UE (step, S1920).

The UE may request a message for a radio resource control (RRC) connection (RRC connection request), and receive a connection setup message for this (RRC Connection Setup), and then, complete a RRC connection setup (RRC Connection Setup Complete) (step, S1930).

The UE may transmit the RRC connection request message in which an establishment cause is setup as MT-Signaling to the RE.

When the RRC connection is setup, the RE may transmit Uplink NAS Transport to the eMME (step, S1940), and the eMME may transmit NAS Transport Complete to the RE in response to this (step, S1950).

When the message transmission for paging is completed, the RE may release the RRC connection state (RRC Connection Release) (step, S1960).

Figure 20:
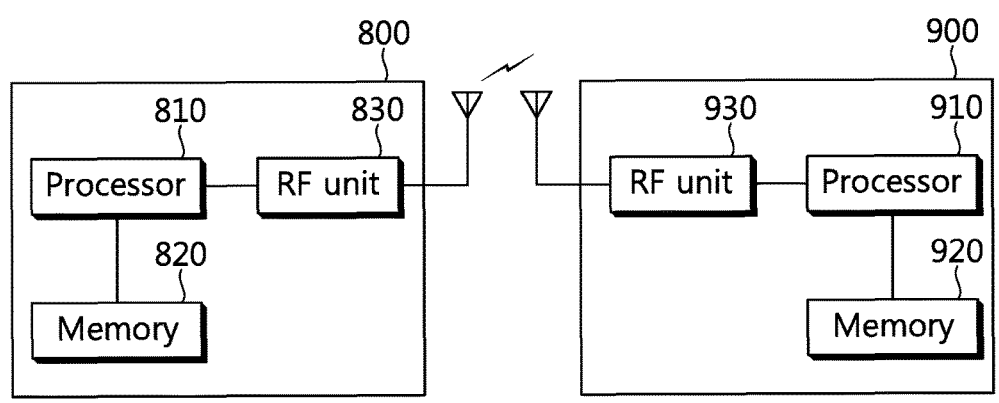
FIG. 20 is a block diagram illustrating a wireless communication system according to an embodiment of the present invention.

FIG. 20 is a block diagram illustrating a wireless communication system according to an embodiment of the present invention.

ABS 800 includes a processor 810, a memory 820, and an RF (radio frequency) unit 830. The processor 810 implements the proposed functions, procedure, and/or methods. The layers of radio interface protocol may be implemented by the processor 810. The memory 820 which is coupled to the processor 810 stores a variety of information for driving the processor 810. The RF unit 830 which is coupled to the processor 810 transmits and/or receives a radio signal. The BS 800 of FIG. 20 may include the cellular BS, the WLAN AP or the RE described above.

A UE 900 includes a processor 910, a memory 920, and an RF (radio frequency) unit 930. The processor 910 implements the proposed functions, procedure, and/or methods. The layers of radio interface protocol may be implemented by the processor 910. The memory 920 which is coupled to the processor 910 stores a variety of information for driving the processor 910. The RF unit 930 which is coupled to the processor 910 transmits and/or receives a radio signal. The UE 900 of FIG. 20 may include the multi-RAT UE described above.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing mobility management in a wireless communication system including an entity of a core network supporting a mobility management function and a user equipment which receives function structure type information on the mobility management function through a first radio interface, the method performed by the entity of the core network comprising:

establishing a non access stratum (NAS) protocol connection between the user equipment and the core network through a second radio interface when the user equipment requests an attachment to the core network through the second radio interface, wherein the user equipment is connected to the core network through the first radio interface and the second radio interface which are served by the mobility management function; and performing the mobility management function through the second radio interface by communicating with the user equipment, wherein the mobility management function includes a globally unique temporary identifier (GUTI) reallocation function that reallocates a GUTI to the user equipment that is common to both the first radio interface and the second radio interface within the entity of the core network, wherein the first radio interface is a Wi-Fi link and the second radio interface is a cellular link, and wherein the mobility management related function further includes an attach and detach function that connects the user equipment to the core network.

2. The method of claim 1, wherein the NAS protocol connection between the user equipment and the core network is maintained while the user equipment performs the mobility management function through the second radio interface.

3. The method of claim 1, wherein the mobility management function further includes at least one of a tracking area (TA) upgrade function, a service request function, a paging function and a NAS message transmission function.

4. The method of claim 3, wherein the NAS protocol connection is formed with the user equipment when the function structure type information indicates that the mobility management function cannot be performed through the first radio interface.

5. The method of claim 3, wherein the NAS protocol connection is formed with the user equipment when the function structure type information indicates that the attach and detach function cannot be performed through the first radio interface.

6. An entity of a core network supporting a mobility management function, for performing mobility management in a wireless communication system including the entity of the core network, and a user equipment which receives function structure type information on the mobility management function through a first radio interface, the entity of the core network comprising:

a transmitter and a receiver; and a processor, connected to the transmitter and the receiver, that:

establishes a non access stratum (NAS) protocol connection between the user equipment and the core network when the user equipment requests an attachment to the core network through a second radio interface, wherein the user equipment is connected to the core network through the first radio interface and the second radio interface which are served by the mobility management function, and performs the mobility management function through the second radio interface by communicating with the user equipment, wherein the mobility management function includes a globally unique temporary identifier (GUTI) reallocation function that reallocates a GUTI to the user equipment that is common to both the first radio interface and the second radio interface within the entity of the core network, wherein the first radio interface is a Wi-Fi link and the second radio interface is a cellular link, and wherein the mobility management related function further includes an attach and detach function that connects the user equipment to the core network.

7. The entity of the core network of claim 6, wherein the NAS protocol connection between the user equipment and the core network is maintained while the user equipment performs the mobility management function through the second radio interface.

8. The entity of the core network of claim 6, wherein the mobility management function further includes at least one of a tracking area (TA) upgrade function, a service request function, a paging function and a NAS message transmission function.

9. The entity of the core network of claim 8, wherein the NAS protocol connection is formed with the user equipment when the function structure type information indicates that the mobility management function cannot be performed through the first radio interface.

10. The entity of the core network of claim 8, wherein the NAS protocol connection is formed with the user equipment when the function structure type information indicates that the attach and detach function cannot be performed through the first radio interface.

* * * * *